US011032997B2

(12) United States Patent
Martin et al.

(10) Patent No.: US 11,032,997 B2
(45) Date of Patent: Jun. 15, 2021

(54) APPARATUS AND METHOD FOR PET WASTE CONTAINMENT AND DISPOSAL

(71) Applicant: Microfine, Inc., Winston-Salem, NC (US)

(72) Inventors: John Martin, Winston-Salem, NC (US); Peter Palmer, Los Gatos, CA (US)

(73) Assignee: Microfine, Inc., Winston-Salem, NC (US)

( * ) Notice: Subject to any disclaimer, the term of this patent is extended or adjusted under 35 U.S.C. 154(b) by 0 days.

(21) Appl. No.: 15/469,544

(22) Filed: Mar. 26, 2017

(65) Prior Publication Data

US 2017/0196192 A1   Jul. 13, 2017

Related U.S. Application Data

(63) Continuation of application No. 14/513,652, filed on Oct. 14, 2014, which is a continuation-in-part of application No. 14/104,262, filed on Dec. 12, 2013, now Pat. No. 9,363,976.

(60) Provisional application No. 61/736,120, filed on Dec. 12, 2012.

(51) Int. Cl.
*A01K 1/01*     (2006.01)
(52) U.S. Cl.
CPC ................... *A01K 1/0107* (2013.01)
(58) Field of Classification Search
CPC .... A01K 1/107; A01K 1/0005; A01K 1/0035; A01K 1/0114; A01K 1/0125; A01K 1/0088
USPC ........ 119/173, 172, 170, 169, 168, 166, 165
See application file for complete search history.

(56) References Cited

U.S. PATENT DOCUMENTS

| 1,773,141 | A | * | 8/1930 | Hodgson | ............... A01K 1/0107 |
| | | | | | 119/165 |
| 3,752,121 | A | * | 8/1973 | Brazzell | ............... A01K 1/0107 |
| | | | | | 119/169 |
| D237,392 | S | * | 10/1975 | Freeborn | ....................... D30/161 |
| 4,008,688 | A | * | 2/1977 | Nicholas | ................. A01K 1/015 |
| | | | | | 119/28.5 |
| 4,722,655 | A | | 2/1988 | Bonerb | |
| 4,723,327 | A | * | 2/1988 | Smith | ................... A61G 7/1026 |
| | | | | | 294/140 |
| 4,800,677 | A | * | 1/1989 | Mack | ................... A01K 1/0107 |
| | | | | | 119/161 |

(Continued)

FOREIGN PATENT DOCUMENTS

FR     2599585 A1 * 12/1987 ........... A01K 1/0125
JP     2006014727 A * 1/2006 ........... A01K 1/0114

OTHER PUBLICATIONS

International Preliminary Report on Patentability issued in PCT/US2017/024199 dated Oct. 10, 2019 (9 pages).

(Continued)

*Primary Examiner* — Ebony E Evans
(74) *Attorney, Agent, or Firm* — FisherBroyles, LLP

(57) ABSTRACT

Herein described is a portable sanitation apparatus for pet waste disposal and method for using the same comprising a micro-composite structure and a means for securing micro-composite structures together to form a macro-composite structure in variable geometric configurations and sizes for greater area coverage. Also described is a vertical member for substantially containing pet waste within the floor area covered by the composite structure.

20 Claims, 19 Drawing Sheets

(56) References Cited

U.S. PATENT DOCUMENTS

| | | | |
|---|---|---|---|
| 4,890,576 A | 1/1990 | James | |
| 4,892,058 A * | 1/1990 | Clark | A01K 1/0107 119/161 |
| 4,979,469 A * | 12/1990 | Clark | A01K 1/0107 119/161 |
| 5,125,121 A * | 6/1992 | Wroble | A47C 31/113 297/219.1 |
| 5,134,974 A * | 8/1992 | Houser | A01K 1/0107 119/165 |
| 5,142,733 A * | 9/1992 | Mogel | A47G 27/0481 15/215 |
| 5,144,911 A * | 9/1992 | Moore | A01K 1/0353 119/28.5 |
| 5,178,426 A * | 1/1993 | David | A01K 1/0107 119/161 |
| 6,645,597 B1 * | 11/2003 | Swain | A01K 1/0107 428/68 |
| 8,113,146 B2 * | 2/2012 | Askinasi | A01K 1/0157 119/165 |
| 8,336,497 B2 * | 12/2012 | van Zuilekom | A01K 1/0107 119/165 |
| 8,438,994 B2 * | 5/2013 | Stratton | A01K 1/0107 119/169 |
| 8,622,023 B1 * | 1/2014 | Tierney | A01K 1/0107 119/165 |
| 8,689,375 B2 * | 4/2014 | Stinchcomb | A47G 9/02 5/502 |
| 9,657,514 B1 * | 5/2017 | Whittemore | E04G 21/241 |
| 9,750,224 B2 * | 9/2017 | Kupka | A01K 1/0107 |
| 10,653,107 B2 * | 5/2020 | Nelson | A01K 1/0125 |
| 2004/0038008 A1 * | 2/2004 | Levine | A61F 13/45 428/189 |
| 2006/0102084 A1 * | 5/2006 | Garfield | A01K 1/0107 119/165 |
| 2006/0156992 A1 * | 7/2006 | Costa | A01K 1/0107 119/161 |
| 2006/0162654 A1 * | 7/2006 | Greenway | B05B 12/20 118/504 |
| 2006/0162666 A1 * | 7/2006 | Mitchell | A01K 1/0107 119/168 |
| 2006/0236949 A1 * | 10/2006 | Hill | A01K 1/0107 119/166 |
| 2007/0113793 A1 * | 5/2007 | Kurahashi | A01K 1/0107 119/479 |
| 2007/0169707 A1 * | 7/2007 | van Zuilekom | A01K 1/0107 119/169 |
| 2008/0060585 A1 * | 3/2008 | Garfield | A01K 1/0107 119/165 |
| 2008/0149038 A1 * | 6/2008 | Vicari | A01K 1/0107 119/171 |
| 2008/0178818 A1 * | 7/2008 | Aley | A01K 1/0107 119/165 |
| 2008/0251026 A1 * | 10/2008 | Bell | A01K 1/0125 119/168 |
| 2010/0176144 A1 * | 7/2010 | Askinasi | A01K 1/0107 221/71 |
| 2010/0307422 A1 * | 12/2010 | Huck | A01K 1/0152 119/161 |
| 2012/0118241 A1 * | 5/2012 | Smith, II | A01K 1/0107 119/167 |
| 2013/0160715 A1 * | 6/2013 | Gouy | A01K 1/0125 119/166 |
| 2014/0158060 A1 * | 6/2014 | Martin | A01K 1/0107 119/169 |
| 2015/0059653 A1 | 3/2015 | Martin | |

OTHER PUBLICATIONS

International Search Report and Written Opinion issued in PCT/US2017/024199 dated Jun. 12, 2017 (9 pages).

* cited by examiner

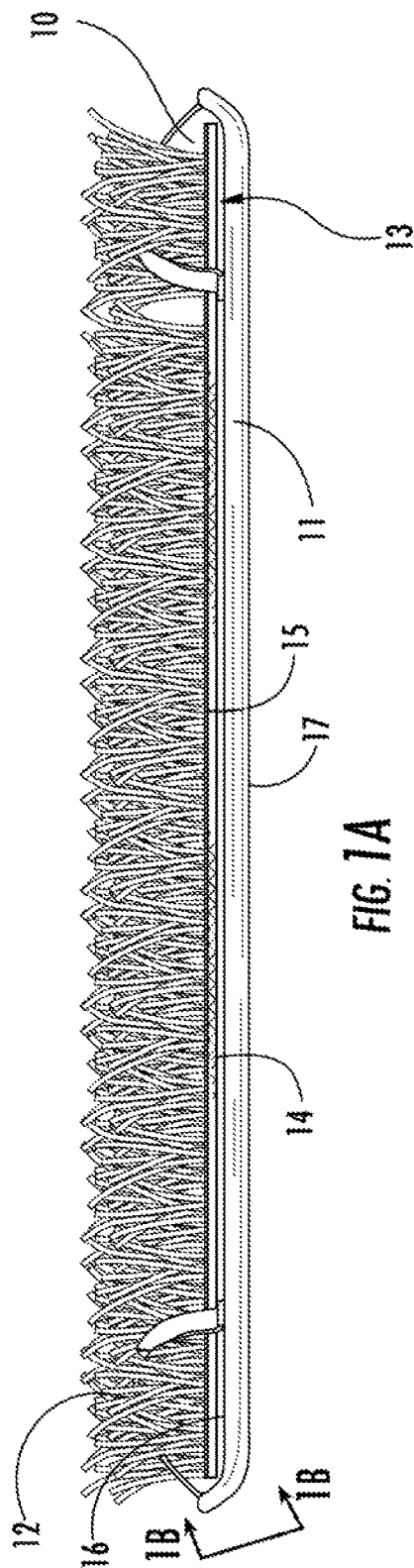
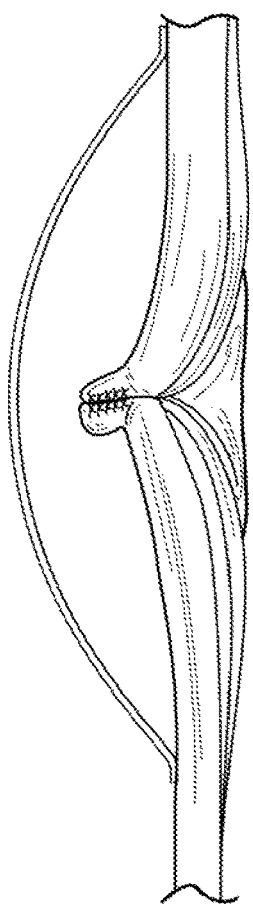

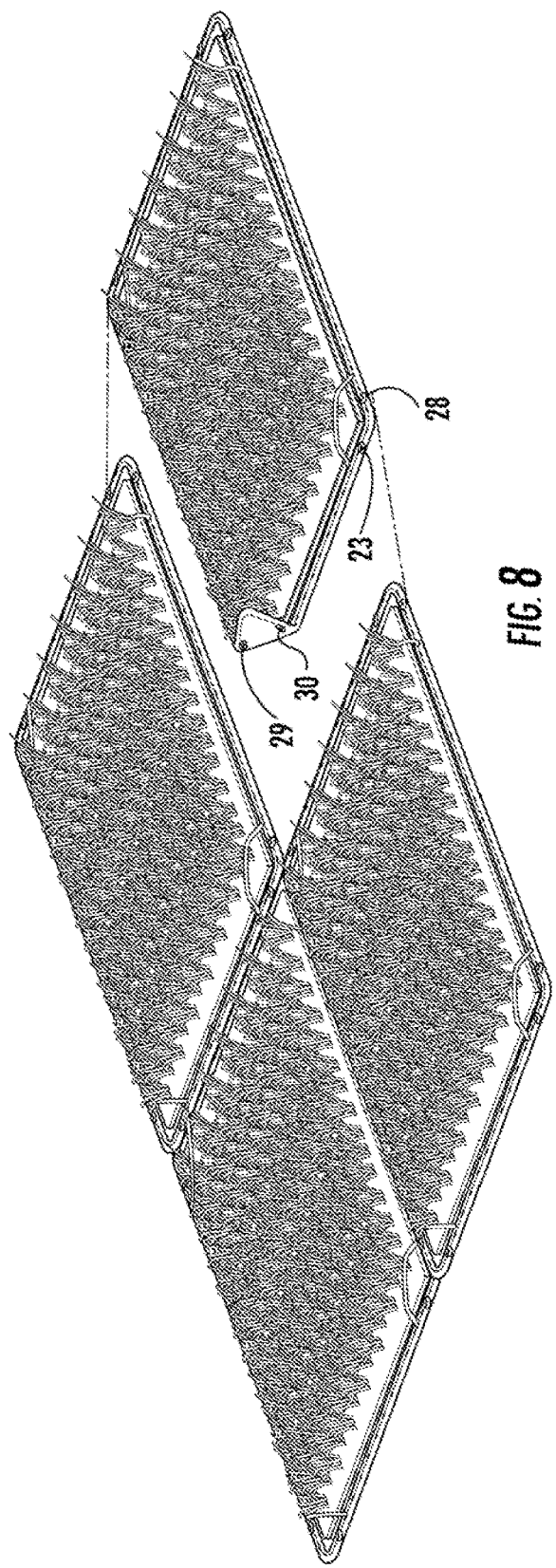

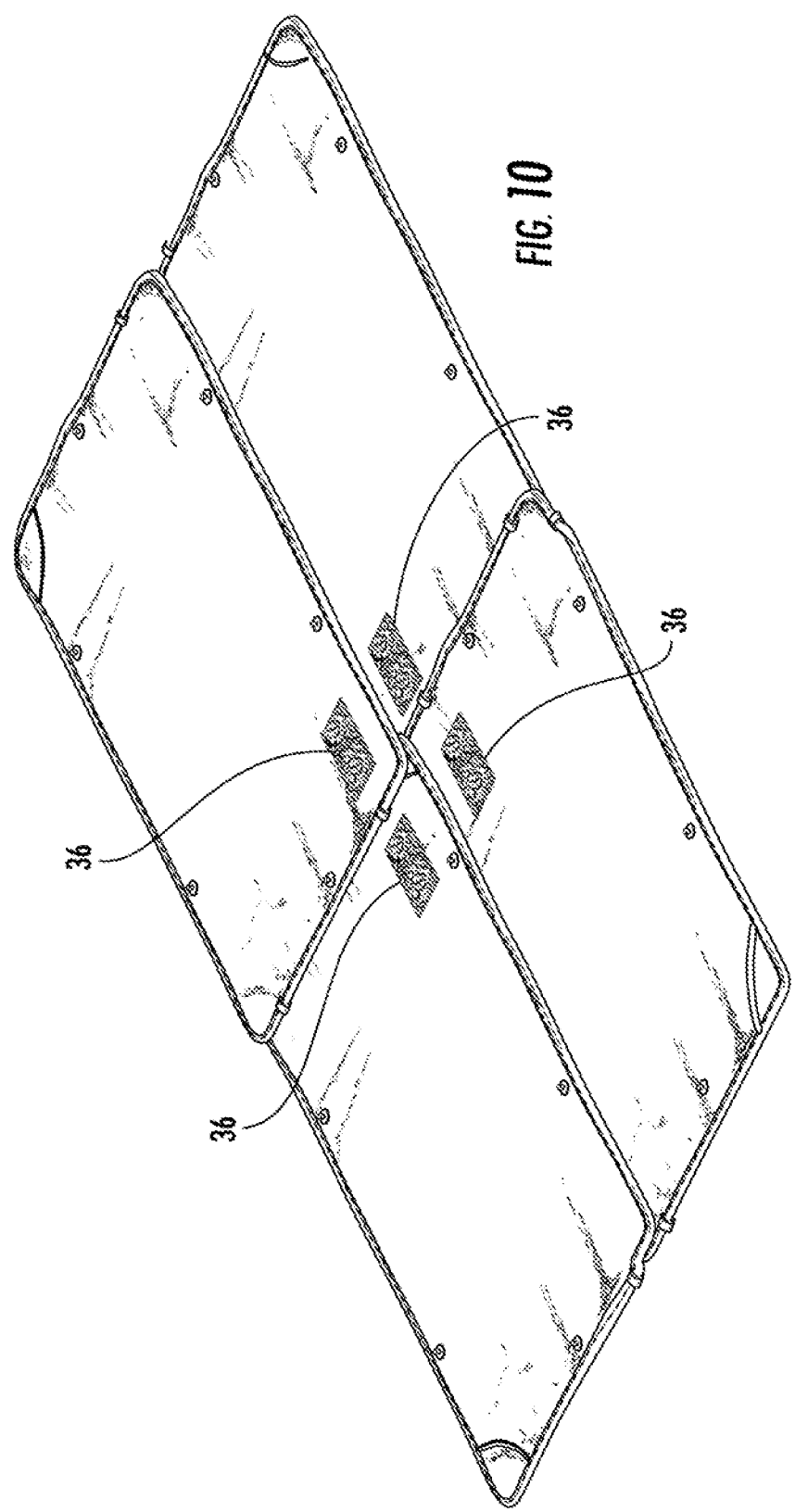

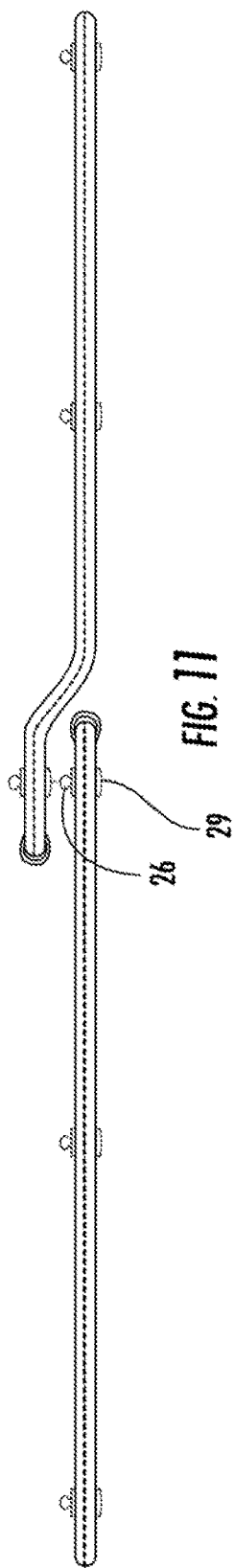

APPARATUS AND METHOD FOR PET WASTE CONTAINMENT AND DISPOSAL

CROSS REFERENCE TO RELATED APPLICATIONS

This application is a continuation-in-part of application Ser. No. 14/513,652, which is a continuation-in-part of application Ser. No. 14/104,262, which issued as U.S. Pat. No. 9,363,976, which claims priority to U.S. Provisional Patent Application Ser. No. 61/736,120 filed Dec. 12, 2012. The disclosures of application Ser. Nos. 14/513,652, 14/104, 262 and 61/736,120 are herein incorporated by reference in their entirety.

FIELD

The general field is pet waste containment and disposal systems in particular, a portable sanitation apparatus for pet waste disposal comprising an overall composite structure (micro-composite) with two primary layers, an engagement mechanism for attaching the two primary layers together, and a means for integrating or combining two or more micro-composite structures together to form a macro-composite for greater area coverage.

BACKGROUND

Urban pet owners, particularly those who live in small flats, condominiums and/or apartments have very few pet waste disposal options. While the owners are away for any significant amount of time, the dog or cat will need to urinate and/or defecate and, unless the person hires a dog walker, pet owners must endure some unpleasant conditions when they return to the dwelling. Moreover, allowing a pet to urinate and defecate unconditionally within an inhabited area is contrary to good health practices without proper containment. Thus, it is desirable to have a system that allows a pet to urinate and defecate as needed in doors; a system that contains the pet waste to a controlled area where it can be collected and disposed of hygienically; a system, that is simple to clean; and a system that is expandable to cover greater surface area if necessary in different geometric configurations.

BRIEF DESCRIPTION OF THE DRAWINGS

Representative embodiments of the invention are disclosed in more detail with reference to the following figures. Like reference numerals designate corresponding pans or steps throughout the different views.

FIG. 1A shows side view of an embodiment of the present invention and FIG. 1B shows an illustration of a cradle stitching embodiment at the corner of the second layer.

FIG. 8 shows an embodiment of present invention illustrating a macro-composite structure.

FIG. 10 shows an embodiment of four second layers snapped together and overlapping one another to form a macro-composite structure.

FIG. 11 shows a side view of two adjacent second layers secured together with partial overlap between second layer's illustrated.

SUMMARY

Figure 2:
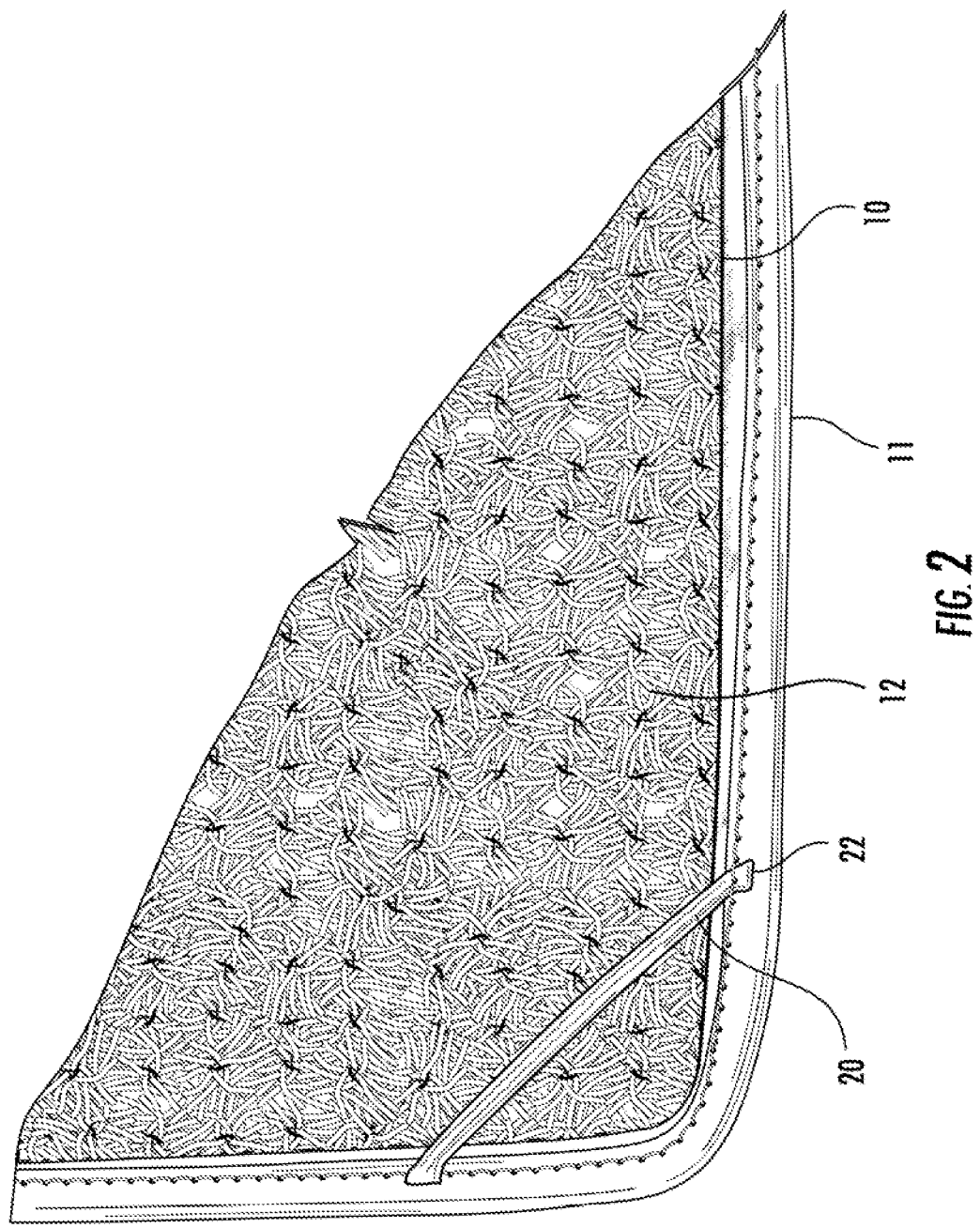
FIG. 2 shows an elevation view of an embodiment of the present invention.

A portable sanitation apparatus for pet waste disposal is provided generally comprising a micro-composite structure with a plurality of layers. In one embodiment, the structure comprises at least two primary layers. In some embodiments, at least one of the primary layers comprises an engagement means wherein the two primary layers are held together in a relatively stable position with respect to another, but wherein the two primary layers can easily and conveniently be disengaged and disassembled.

In one embodiment, the portable sanitation apparatus comprises two primary layers, a first layer and a second layer. The first layer of the composite structure can have a composition resembling that of a natural outside environment, such as grass for example and can, itself, comprise multiple layers. In some embodiments, the first layer comprises artificial grass-like fibers made from one or more compounds such as polypropylene, polyethylene, polymethylpentene, polybutene-1, polyisobutylene, ethylene propylene rubber, and ethylene propylene diene Monomer rubber. The first layer can also comprise a backing material further comprising a mesh substrate, a meshed backing material, and a binder material.

The second layer of the composite structure also can comprise multiple layers. In some embodiments, the second layer comprises at least an absorbent top element designed to trap and hold urine or other fluid therein and an impervious backing element for preventing moisture from escaping the absorbent top element.

In one embodiment, the absorbent top element comprises a blend of thermoplastic and cellulosic fibers mechanically entangled and heat bonded together. In one embodiment, the impervious backing element can comprise a woven polyester knit fabric reinforced with polyvinyl chloride. In another embodiment, the second layer also comprises a substantially permeable layer that permits passage of urine and other liquid waste through and into the absorbent top element while itself staying relatively dry and comfortable to the pet. In one embodiment, the substantially permeable layer is a polyester knit fabric. The substantially permeable layer and the impervious backing element can, in some embodiments, sandwich the absorbent top element therebetween.

In one embodiment, the binder material in the first layer can be deposited to the surface of the mesh substrate and made of one or more compounds such as latex, acrylic styrenated acrylics, vinyl acetate, ethylene vinyl acetate, styrene butadiene, polyvinyl chloride, ethyl/vinyl chloride. In another embodiment, the binder material can be made of styrene butadiene latex.

In some embodiments, the absorbent top element can comprise 40% by weight of rayon, 17% by weight of polyester, 21% by weight of polyethylene and a low melt polyester blend, and 22% by weight of polypropylene. In another embodiment, the absorbent top element can comprise at least about 40% by weight of rayon. In an alternative embodiment, the top absorbent element comprises at least about 40% by weight of cotton. And in yet another embodiment, the top absorbent element comprises at least about 40% by weight of a cotton and rayon blend.

In some embodiments, the absorbent top element can comprise an antimicrobial agent. In one embodiment, the top absorbent element comprises 2,4,4'-trichloro-2'-hydroxy-diphenyl ether as the antimicrobial agent.

The composite structures of the present invention can be combined with other composite structures to form a macro-composite for increased surface area coverage, in some embodiments, second layers can be engaged to and secured to one another to ensure stable maximum and versatile area coverage with minimal to no fluid leakage or seepage between connected composite structures. In other embodiments, specially designed trays can be engaged to and secured to one another to ensure stable maximum coverage with minimal to no fluid seepage due to the engagement between trays. The shapes and sizes of a macro-composite structure can be quite varied. For example, in some embodiments, the area covered by a macro-composite is a rectangle or a square for wider area coverage. In some embodiments, the area covered can be as wide as a single row of micro-composite structures, for example, for hall way coverage.

In one embodiment, the macro-composite comprises one or more vertical members which help to confine unwanted pet waste to the composite structure for pets with poor aim, in particular male dogs with a preference for the lifted leg over the squatting urination technique. In one embodiment, the vertical members comprise integral attachment elements which engage one or more components of the underlying composite to secure the vertical members to the underlying components at a substantially 90° angle to said components. In another embodiment, the vertical members are arranged about one or more of the perimeter or exterior edges of the underlying composite components. In yet another embodiment, the integral attachment element is a hook that is positioned on one or more outside edges of the vertical members and that engage elastic straps attached to the underlying composite components.

In another embodiment, interior walls of the vertical members can be covered with one or more wall covers which can be comprised of an absorbent fabric and prevent splatter when the pet urinates. In some embodiments, the wall covers can comprise snaps and elastic straps for securing adjacent wall covers together, wall covers to second layers, and wall covers to vertical members.

DETAILED DESCRIPTION

The present invention now will be described more fully hereinafter with reference to the accompanying drawings, which form a part hereof, and which show, by way of illustration, specific exemplary embodiments by which the invention can be practiced. This invention can, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention can be embodied as methods or devices. The following detailed description is, therefore, not to be taken in a limiting sense.

Throughout the specification and claims, the following terms take the meanings explicitly associated herein, unless the context clearly dictates otherwise. The phrase "in one embodiment" or "in some embodiments" or "in a preferred embodiment" as used herein does not necessarily refer to the same embodiment, though it can. Furthermore, the phrase "in another embodiment" as used herein does not necessarily refer to a different embodiment, although it can. Thus, as described below, various embodiments of the invention can be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

By way of illustration, FIG. 1A shows a side view of an embodiment of the invention. The overall composite structure comprises a plurality of layers designed to prevent pet liquid waste from leaving the composite structure and leaking onto the surface upon which the composite structure rests. In one embodiment, the composite structure comprises a first layer 10 fabricated as to mimic a naturally occurring surface (such as artificial turf) familiar to the pet. The structure also can comprise a second layer 11 comprised of an absorbent material. It should be recognized that some users of the pet waste disposal system of the present invention can desire to forego one or more of the layers. For example, users can determine that their pet does not require the first layer 10 which is designed to mimic a naturally occurring surface and does little to absorb and confine the pet waste. In this vein, the user can simply use the second, layer 11 or the second layer combined with another layer.

As mentioned above, in some embodiments, first layer 10 can simulate the look and feel of natural turf. Preparations of natural or artificial turf are known in the art and described in U.S. Pat. Nos. 1,939,846; 3,332,828; 3,944,452; 3,995,079; 4,007,307; 4,012,545; 4,230,752; and 4,268,551. Similarly, a variety of artificial turf mat constructions have been designed for golf practice surfaces. For example, U.S. Pat. No. 6,156,396 uses a relatively thick base pad of resilient material (foam rubber) and an artificial grass-like carpet. U.S. Pat. No. 5,830,080 by Reynolds discloses a turf simulating surface including a grass-like carpet layer placed over various layers of material, each layer designed to simulate the shock absorbing nature of corresponding layers of soil.

Each of the preceding U.S. patents is incorporated by reference in its entirety and in a manner consistent with the present document. It should be understood that the present invention is likewise applicable to structures, composites, or products.

As depicted in the embodiments shown in FIGS. 1A, 2, 3, and 6, first layer 10 is an artificial grass-like structure comprising grass-like fibers 12 from the olefin family of polymers. For example, the fibers can be composed of polypropylene, polyethylene, polymethylpentene, polybutene-1, polyisobutylene, ethylene propylene rubber, ethylene propylene diene Monomer rubber, at the like. In a preferred embodiment, grass-like fibers 12 are made of polyethylene.

Figure 3:
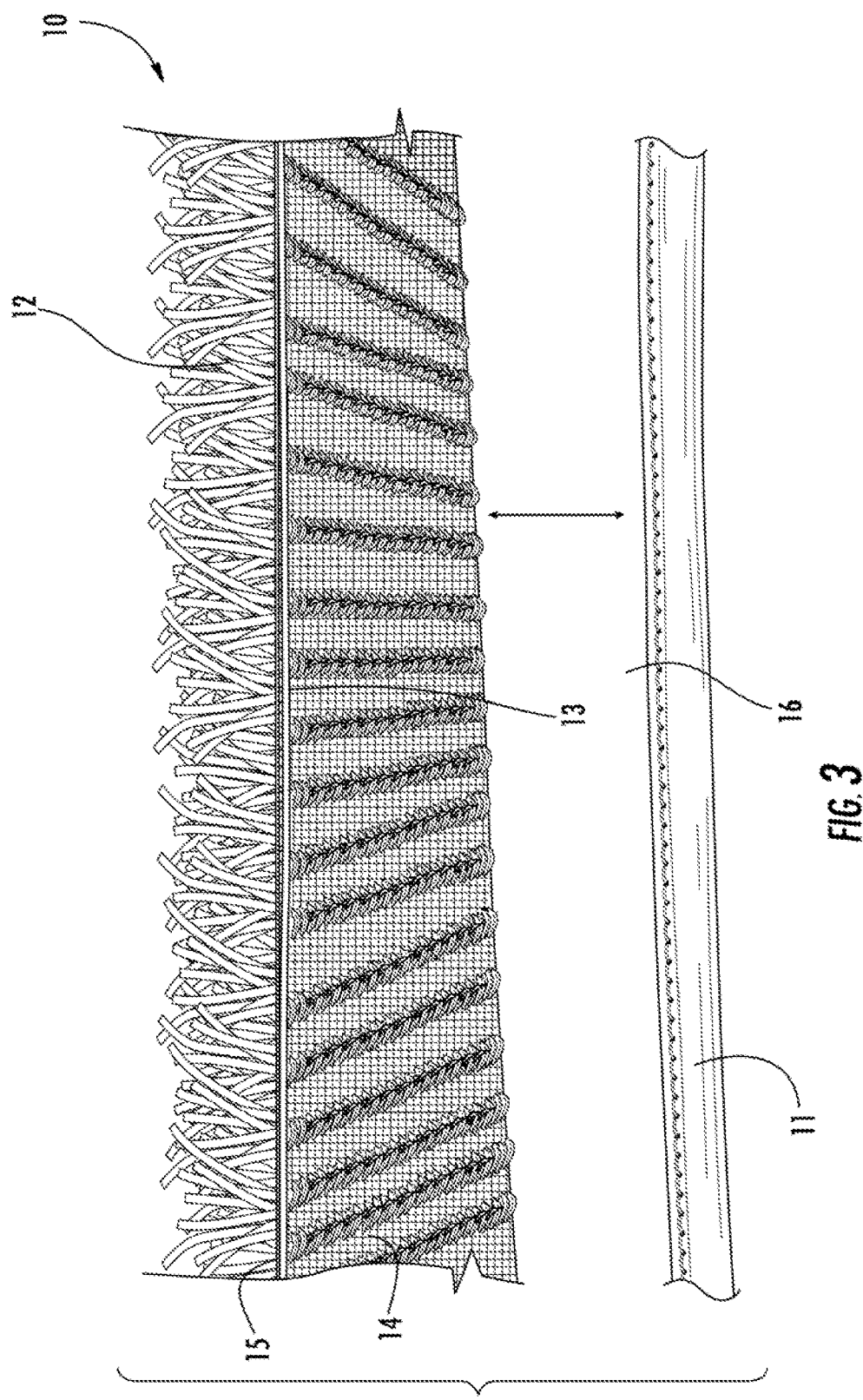
FIG. 3 shows a side view of an embodiment of the present invention with first layer lifted and exposing second layer.

Referring primarily to the embodiment shown in FIG. 3, first layer 10 includes a fiber substrate component 13 which comprises a mesh substrate 14 made of a material flexible enough to allow some folding or rolling of the first layer 10, but rigid enough to maintain the general shape and form. In one embodiment, mesh substrate 14 is made of a polyolefin based polymer, for example polypropylene, polyethylene, polymethylpentene, polybutene-1, polyisobutylene, ethylene propylene rubber, ethylene propylene diene monomer rubber, at the like. In a preferred embodiment, mesh substrate 14 is made of polypropylene.

Figure 6:
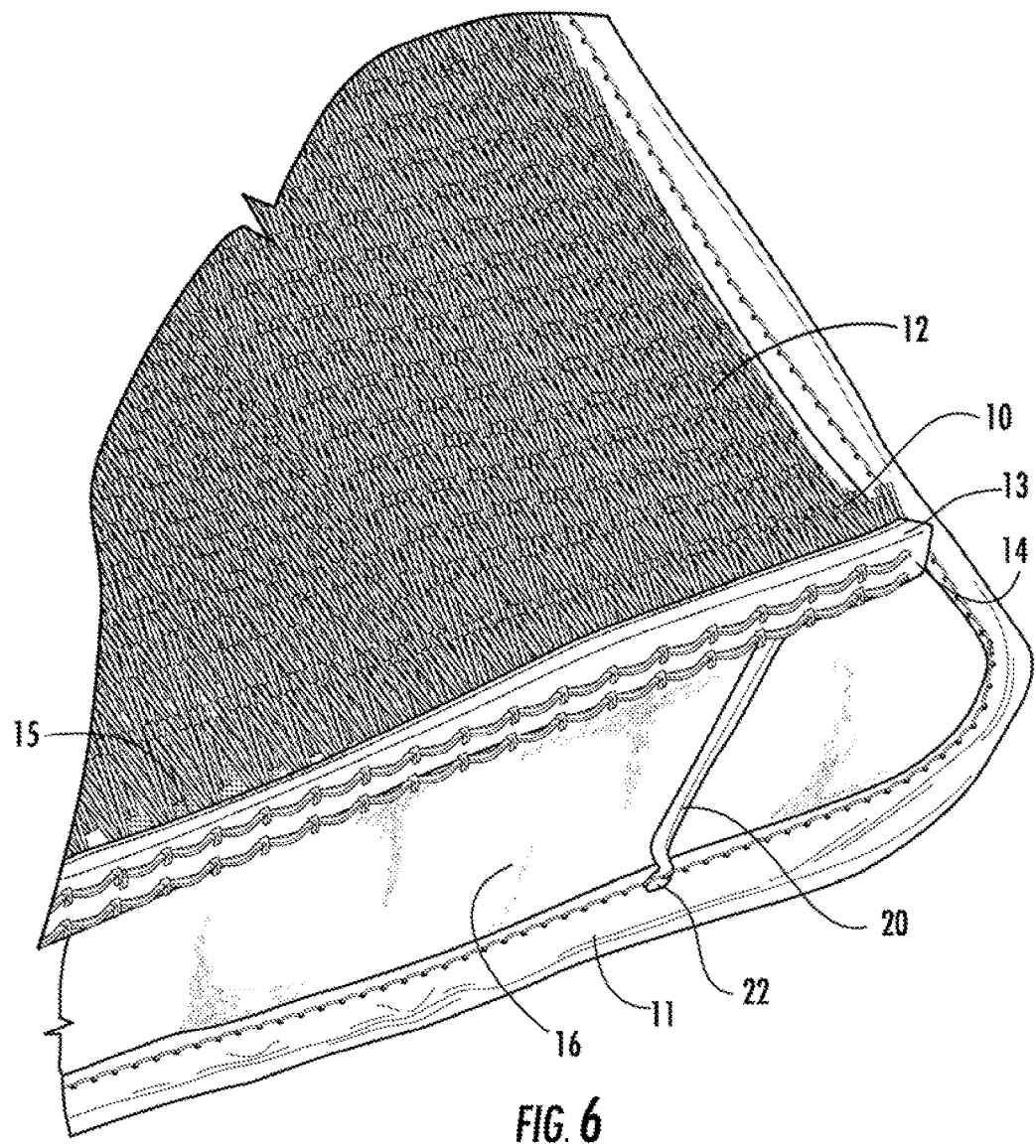
FIG. 6 shows an elevation view of an embodiment of the present invention.

Referring now the embodiment illustrated in FIG. 6, backing 13 on first layer 10 further comprises a thin meshed backing material 15 that is affixed to the mesh substrate 14 in between the grass-like fibers 12 and the mesh substrate 14. Meshed backing material 15 can be affixed to mesh substrate 14 by any means known to those of skill in the art, including gluing and the like. In some embodiments, grass-like fibers 12 are woven or punched through meshed backing material 15 into and through mesh substrate 14.

Fiber substrate component 13 on first layer 10 can additionally comprise a binder material for affixing, or binding the grass-like fibers 12 to the mesh substrate 14 and meshed backing material 15. In a preferred embodiment, said binder material is deposited to the surface of the mesh substrate 14 at or near where the grass-like fibers 12 emerge there through. Suitable binding materials include latex, acrylic, styrenated acrylics, vinyl acetate (VAC), ethylene vinyl acetate (EVA), styrene-butadiene, polyvinyl chloride (PVC), ethylene/vinyl chloride and the like. In a preferred embodiment, the binder material is styrene butadiene latex.

Figure 4:
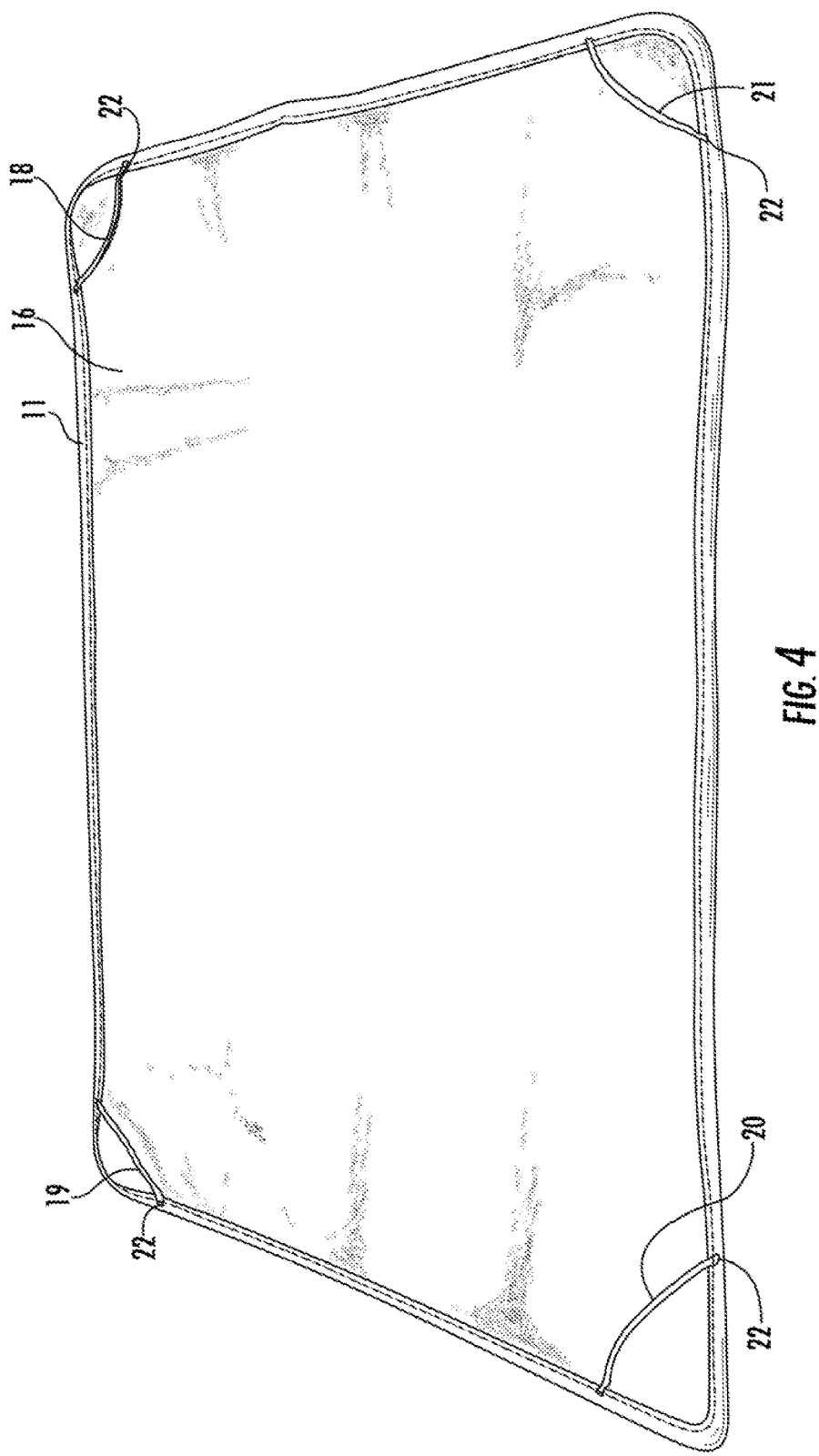
FIG. 4 shows an elevation view of an embodiment of the second layer of the present invention.

Absorbent second layer 11 (generally illustrated in FIG. 4), itself, can comprise multiple layers. Examples of such absorbent composite multi-layered structures are known in the art and have been described in, for example, U.S. Pat. No. 4,798,603 issued Jan. 17, 1989 to Meyer et al. and entitled Absorbent Article Having a Hydrophobic Transport Layer. Other examples include, U.S. Pat. No. 4,338,371 issued Jul. 6, 1982 to F. Dawn, et al. and U.S. Pat. No. 4,259,958 issued Apr. 7, 1981 to R. Goodbar. Other configurations have employed embossed layers configured to provide raised regions that separate the user from the absorbent pad. For example, see U.S. Pat. No. 4,324,247 issued Apr. 13, 1986 to M. Aziz; U.S. Pat. No. 4,041,951 issued Aug. 16, 1977 to L. Sanford; U.S. Pat. No. 3,945,386 issued Mar. 23, 1976 to E. Anczurowski, et al.; and U.S. Pat. No. 4,413,032 issued Nov. 1, 1983 to L. Hartmann, et al., U.S. Pat. No. 4,480,000 issued Oct. 30, 1984 to I. Watanabe, et al. describes an absorbent article which includes an absorbent core layer and a barrier covering the lateral faces and the underneath face of the absorbent core layer. A web predominantly comprised of a polyester fiber is placed on top of the absorbent core layer, and a nonwoven fabric is wrapped around the structure. The absorbent articles are described as being able to absorb fluid at an enhanced rate and have a feeling of dryness even after such absorption. U.S. Pat. No. 3,987,792 issued Oct. 26, 1976 to Hernandez, et al. describes a disposable diaper comprising, in order, a water-pervious layer; a spongy, resilient and compressible hydrophobic fibrous layer; an absorbent core; and a water-impervious layer. The hydrophobic fibrous layer is pervious to fluids in the uncompressed condition, but is impervious to fluids when compressed. The description indicates that the compressed fibers intermesh to form a seal or barrier. Each of the preceding U.S. patents is incorporated by reference in its entirety and in a manner consistent with the present document.

Figure 5:
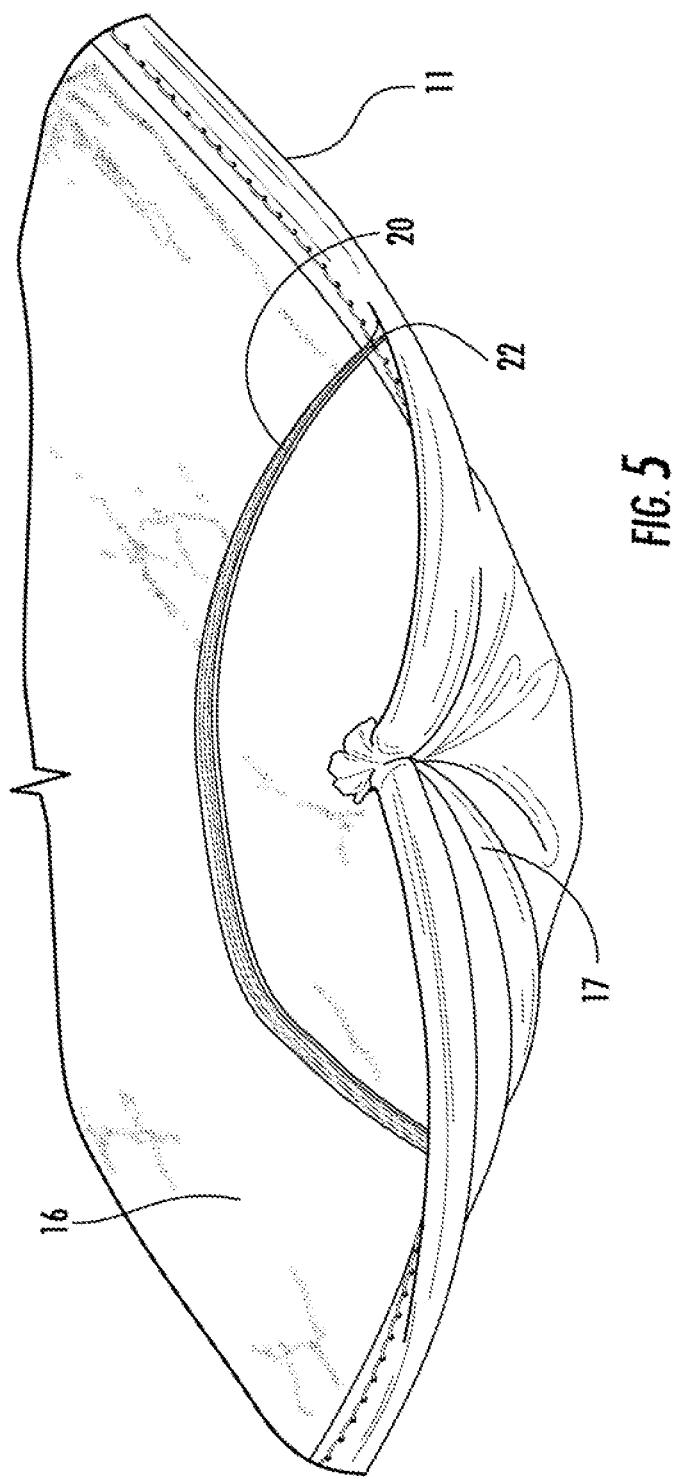
FIG. 5 shows an embodiment of the second layer with a cradle stitch design.
Figure 7:
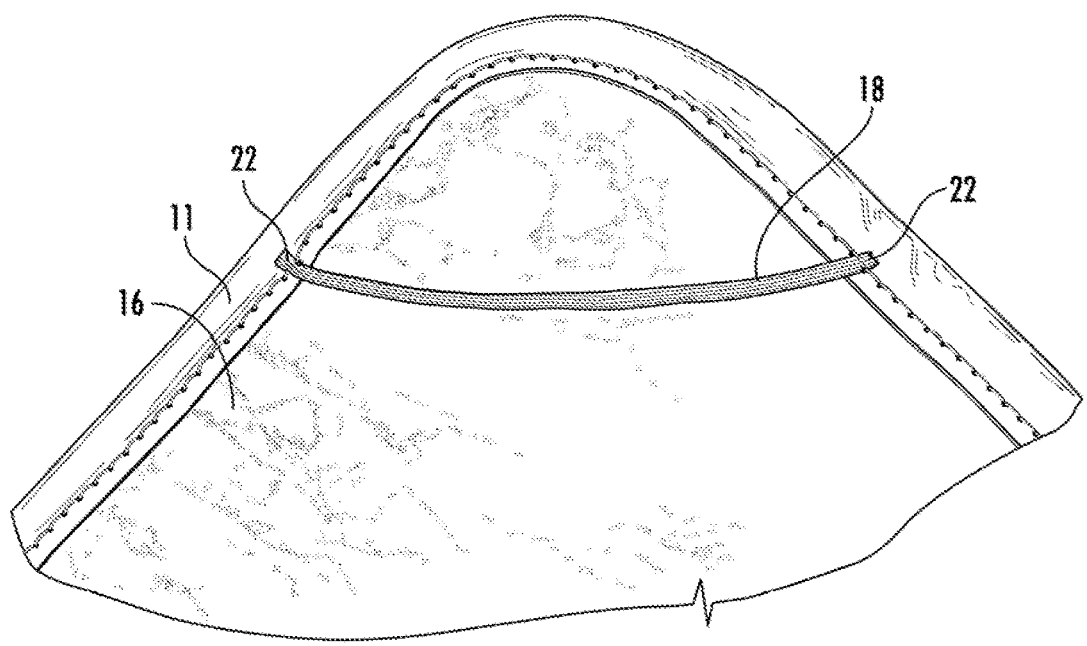
FIG. 7 shows an elevation view of an embodiment of the second layer.

Referring now to FIGS. 6 and 7, absorbent second layer 11 comprises, at least two layers, a top layer 16 and a bottom layer 17 (shown in FIGS. 1 and 5). Bottom layer 17 can be described as ah impervious "fabric-like" synthetic composition designed to prevent moisture from escaping from the composite after it passes into the absorbent top layer 16. In one embodiment, bottom layer 17 comprises a woven polyester knit fabric reinforced with polyvinyl chloride (PVC). In one embodiment, the reinforced polyvinyl chloride is on the side of the absorbent second layer 11 that is visible to the user of the apparatus to help confine liquid pet waste to the other layers.

Top layer 16 can consist of a synthetic and/or cellulosic blend of fibers that provides a durable structure. En one embodiment, top layer 16 is a blend of thermoplastic and cellulosic fibers that are mechanically entangled and heat bonded. Fibers suitable for the purposes of the invention include cellulosic and/or synthetic thermoplastic fibers, including but not limited to polyolefin polymers. For example, a suitable blend of natural and synthetic fibers for the purposes of the present invention consists of polyester (low melt), polyethylene, rayon, cotton, and/or polypropylene. In one embodiment, the rayon can be used in place of the cotton and vice versa.

Proportions of the blend of fibers comprising the top layer 16 for the purposes of the present invention are variable. Desirable performance has been noted when each individual fiber constituent is within about 10 to 75% by weight. For example, in one embodiment the proportions are as follows: rayon 40%, polyester 17%, polyethylene+low melt polyester 21%, and polypropylene 22% by weight. It has been observed that optimal absorbency is achieved when the blend is comprised, of at least about 40% by weight of rayon and/or cotton.

Fiber constituents of the top layer 16 can contain certain agents embedded into the fibrous structure that improve the performance of the invention. For example, high density polyethylene fibers can be used which embed biocides, antimicrobials, anti-viral, and/or antifungal agents. Examples of commercially available antimicrobial agents include but are not limited to BARDAC®. 2050 and BARDAC® 2080 (based on dialkyl($C_8$-$C_{10}$)dimethyl ammonium chloride); BARDAC®. 2250 and BARDAC®. 2280 (didecyl dimethyl ammonium chloride); BARDAC®. LF and BARDAC®. LF 80 (based on dioctyl dimethyl ammonium chloride); BARQUAT® MB-50 and BARQUAT® MB-80 (based on alkyl dimethyl benzyl ammonium chloride); BARQUAT® MX-50 and BARQUAT® MX-80 (based on alkyl dimethyl benzyl ammonium chloride); BARQUAT® OJ-50 and BARQUAT® OJ-80 (based on alkyl dimethyl benzyl ammonium chloride); BARQUAT® 4250, BARQUAT® 4280, BARQUAT® 4250Z, and BARQUAT® 4280Z (based on alkyl dimethyl benzyl ammonium chloride and/or alkyl dimethyl ethyl benzyl ammonium chloride); and BARQUAT® MS-100 (based on myristyl dimethyl benzyl ammonium chloride), which are available from Lonza, Inc., Fairlawn, N.J.

Other anti-microbial agents that can be used include halogenated diphenyl ethers like 2,4,4'-trichloro-2'-hydroxy-diphenyl ether (Triclosan® or TCS) or 2,2'-dihydroxy-5,5'-dibromo-diphenyl ether; phenolic compounds like phenoxyethanol, phenoxy propanol, phenoxyisopropanol, para-chloro-meta-xylenol (PCMX), etc.; bisphenolic compounds like 2,2'-methylene bis(4-chlorophenol), 2,2'-methylene bis(3,4,6-trichlorophenol), 2,2'-methylene bis(4-chloro-6-bromophenol), bis(2-hydroxy-3,5-dichlorophenyl)sulphide, and bis(2-hydroxy-5-chlorobenzyl)sulphide; halogenated carbanilides (e.g., 3,4,4'-trichlorocarbanilides (Triclocarbane or TCC); benzyl alcohols; chlorhexidine; chlorhexidine gluconate; chlorhexidine hydrochloride, and silver based antimicrobial agents, such as, for example, Silver-Shield® and various nanosilvers. Other suitable antimicrobial compounds can include those supplied by Thomson Research Associates, Inc., such as Ultra-Fresh DM-50 or Silpure.

In some embodiments, absorbent second layer 11 can comprise additional layers at any position within the sandwich structure. For example, the absorbent second layer 11 can include a top cover component that is made of a material with substantial wicking properties that wicks the moisture through quickly and into the top layer 16. In some embodiments, the top cover component can be a porous synthetic woven material, for example, manufactured of polyester fibers or a polyester blend of fibers. Users who desire a higher friction coefficient of the absorbent second layer promoting a more stable engagement between first and second layer with minimal relative movement between the layers, can forego the top cover component and prefer an uncovered top layer 16. Top layer 16 can incorporate other constituents into its composition or can be treated in such a manner to promote greater friction between first layer 10 and the absorbent second layer 11 for enhanced stability between layers.

In some embodiments, the composite structure (e.g. the absorbent layer 11) can include other beneficial adjuvants, such as for example, odor neutralizing agents useful for suppressing, treating, or preventing offensive and/or undesirable odors. For example, absorbent layer 11 can comprise aldehydes, flavonoids, metallic salts, water-soluble polymers, zeolites, activated carbon and mixtures thereof that are useful in such a manner. Other odor suppressing adjuvants are well known in the art and can be used for this purpose.

Perfumes and perfumery ingredients can also be used which comprise a wide variety of natural and synthetic chemical ingredients, including but not limited to, aldehydes, ketones, esters, and the like. Also included are various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes can comprise extremely complex mixtures of such ingredients. Pro-perfumes are also useful in the present invention. Such materials are those precursors or mixtures thereof capable of chemically reacting e.g. by hydrolysis to release the perfume.

Absorbent second layer 11 can be manufactured such that the corners and/or edges of the layer bend slightly upward as depicted in FIG. 1B and FIG. 5. In this arrangement, second layer 11 is designed to cradle first layer 10 to confine the urine and/or other liquids to second layer 11's absorbent portions. This design would effectively prevent urine or other liquids from dripping down the sides of second layer 11. The cradling effect of second layer 11 can be accomplished using known assembly and stitching techniques which create sufficient tension and force at the corners to cause the corners to bend upwards as illustrated in FIG. 1B.

First layer 10 and/or second layer 11 can comprise a first engagement means wherein first layer 10 can be secured to second layer 11 or vice versa. The first engagement means employed must be capable of quick and convenient disengagement allowing the user to conveniently disassemble the overall composite structure and clean first layer 10 and second layer 11 as needed. Suitable structures for engagement between first layer 10 and second layer 11 include elastic straps, pressure sensitive adhesive, Velcro®, zippers, buttons, toggles, snaps, grommets, magnets, ties, and the like. In the embodiment illustrated in FIGS. 1, 2, and 4 engagement means comprises elastic straps 18, 19, 20, and 21 sewn at their termini into the binding 22 at each corner of the second layer 11. It should be recognized that the engagement means can be attached to any layer or component of the composite structure. For example, in some embodiments, a binding 22 is not used and the termini of the elastic straps can be sewn into the bottom surface of second layer 11 e.g., at serge stitching along the outer perimeter of the second layer which secures the bottom layer 17 to the second layer.

Referring now to FIG. 8, in some embodiments, one or more of the layers of the composite structure can be modular and attachable to other modular components to cover a larger area. For example, with continued reference to FIG. 8, second layer 11 can comprise securing members around the perimeter of the modular section which, in this embodiment, can be a 2'×3' rectangular section. Securing members can comprise snaps, buttons, Velcro, adhesive, or the like. It should be recognized that any method or structure can be used to secure adjacent modular sections to one another such that the sections are laid out substantially flat and with minimal overlap between them.

Figure 9A:
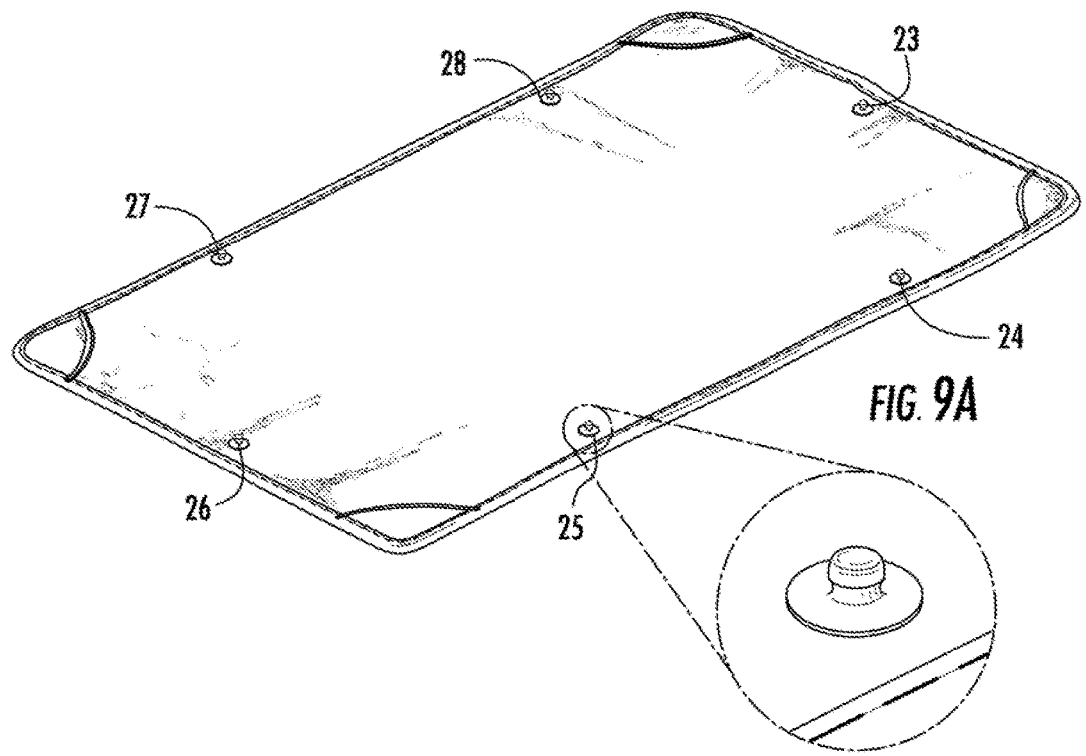
FIG. 9A-B shows an embodiment of the second layer of a composite structure with top and bottom snap elements used to engage corresponding snap elements of other second layers.
Figure 9B:
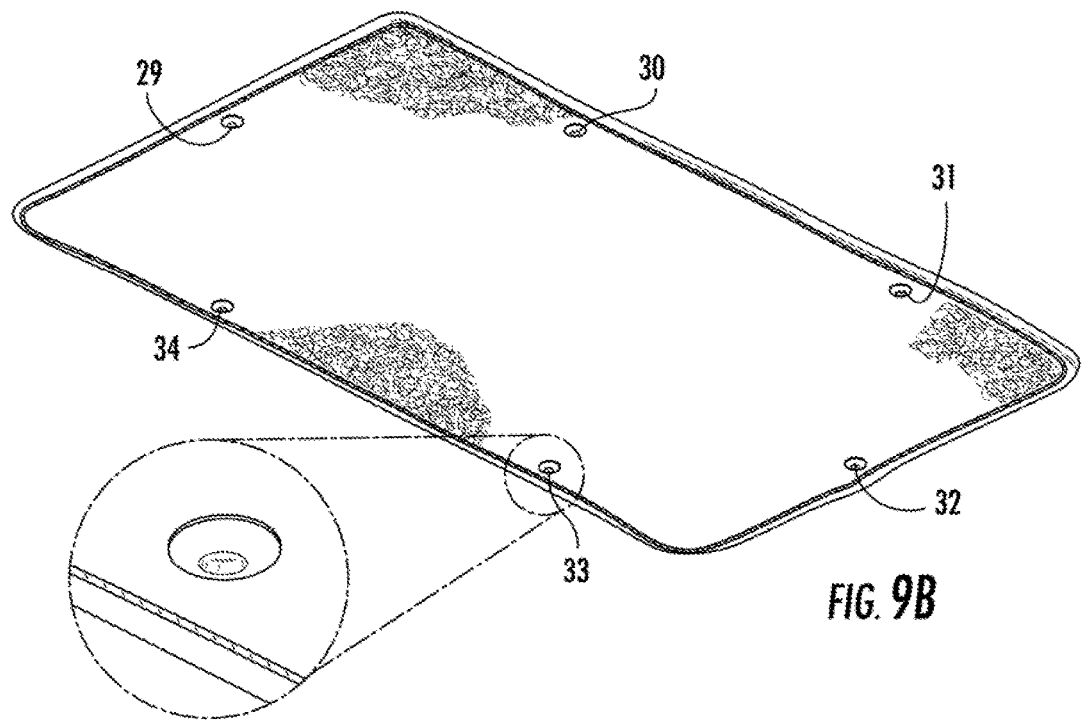

Referring now to the embodiment shown in FIG. 9A-B, second layer 11 can comprise both male and female snap elements for engagement with other adjacent composite structures. For example, in one embodiment male snap elements 23-28 can be placed around the perimeter of the top surface of second layer 11 and complementary female snap elements 29-34 can be placed around the perimeter of the bottom surface of the second layer 11 for securing to their male counterparts. The snap elements 23-34 can be positioned such that adjacent second layer's that have been secured together via snap elements or other securing member partially overlap as, shown most clearly in FIGS. 10-11. This is important to prevent unwanted seeping of fluids through or between second layers. In one embodiment, snap elements are furthermore positioned within or upon the absorbent surface inside the outer perimeter binding. This ensures that any fluid dripping off the side of the top second surface will be captured and contained by the absorbent material on the bottom second layer. In one embodiment, snap elements are at least 0.25 inches from the nearest outer edge of second layer 11.

Figure 12:
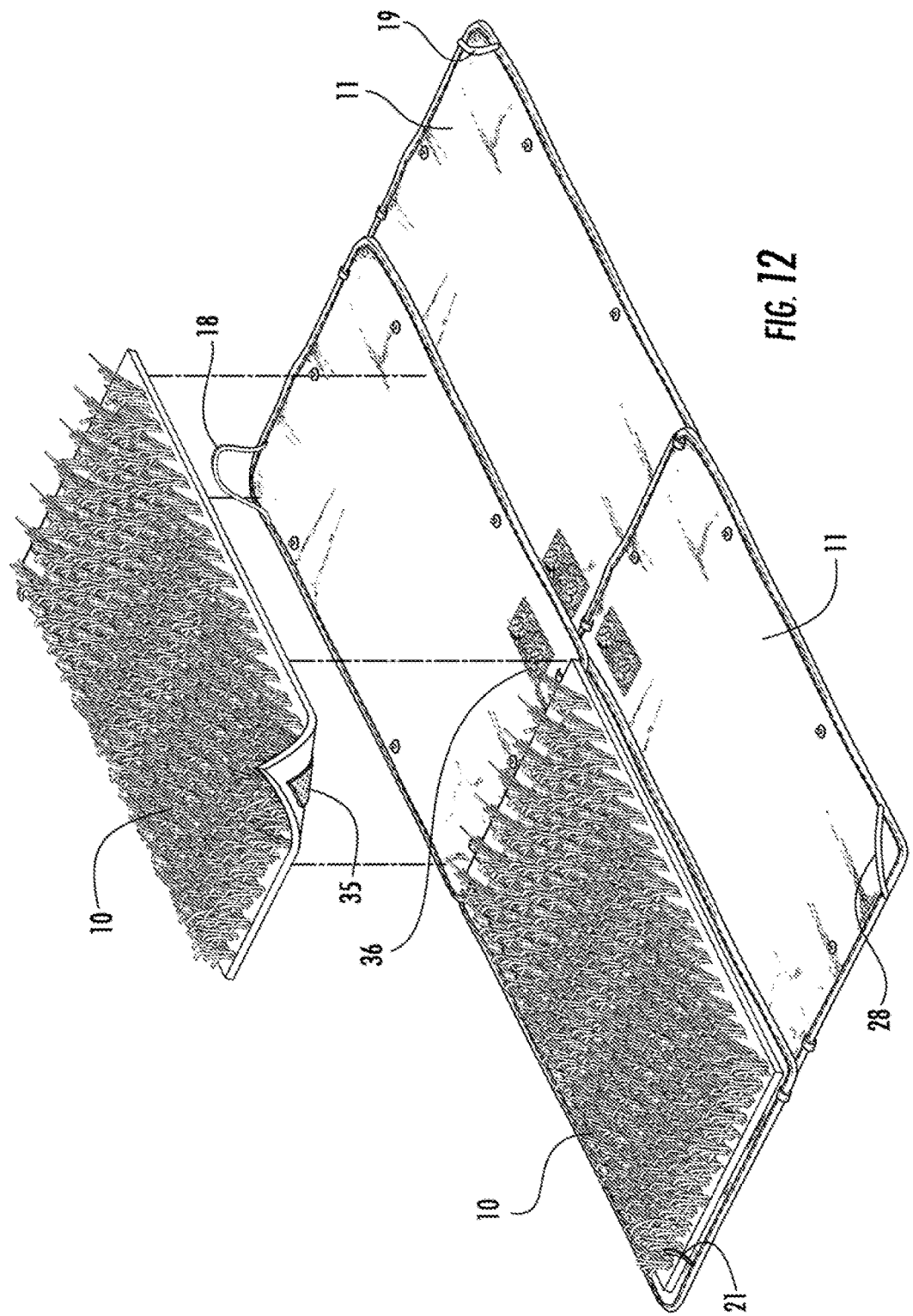
FIG. 12 shows an elevated view of the formation of a macro-composite from four micro-composites without trays.

As shown in the embodiment depicted in FIG. 12, in use, all four elastic straps 18, 19, 20, and 21 or a subset of the straps can be used. For example, when engaging four composite structures (two or more micro-composite structures combined "macro-composite"), the user can decide to use only the straps positioned at the four corners of the macro-composite. For enhanced stability between first layer and second layer, first and second layer can comprise a second engagement means 35, 36 (shown in FIG. 12), for example, Velcro to further secure first layer to second layer. Applying a second engagement means would help to avoid unwanted movement of first layer with respect to second layer, for example, in a macro composite when fewer than all four straps on one composite unit are used.

Figure 13:
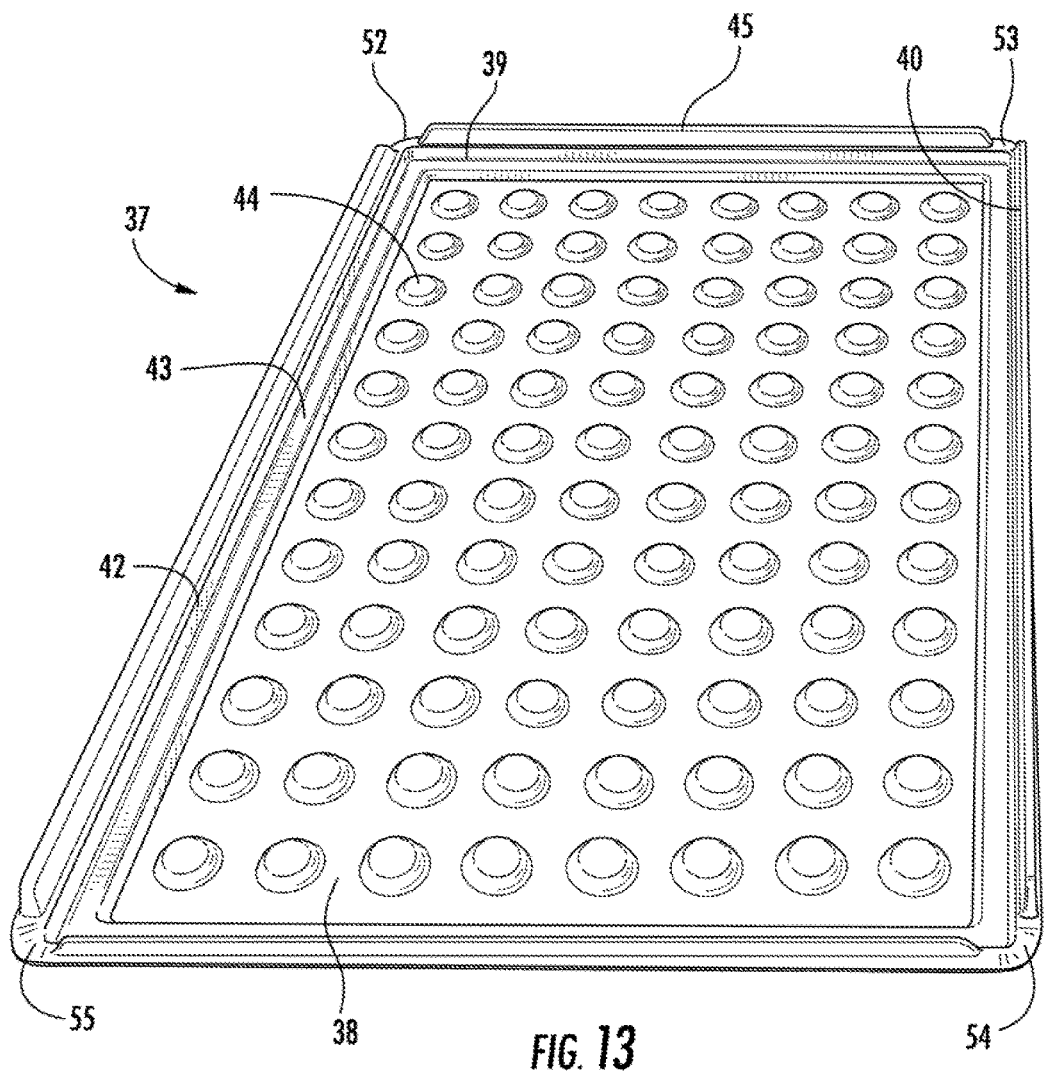
FIG. 13 shows an embodiment of a tray.
Figure 14A:
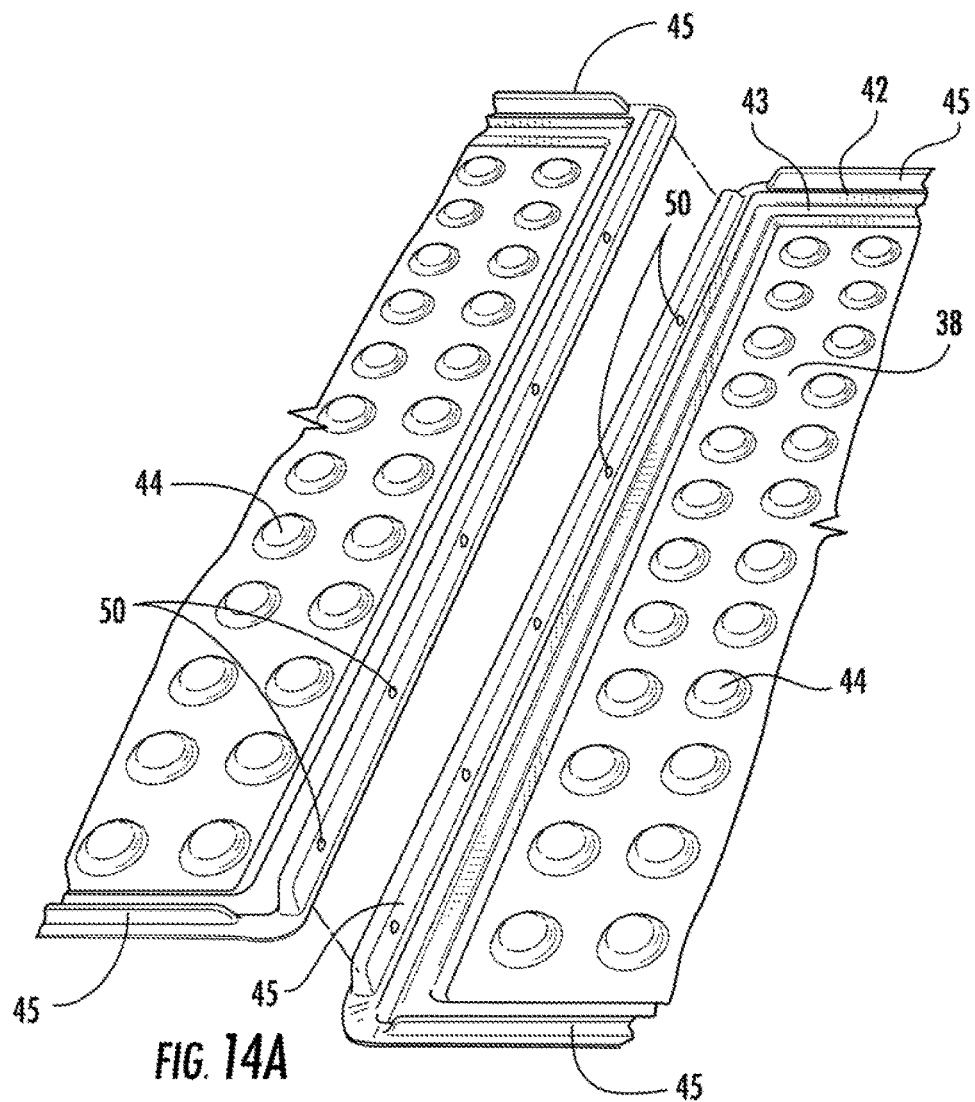
FIG. 14A shows tongue and groove engagement between two adjacent trays.
Figure 14B:
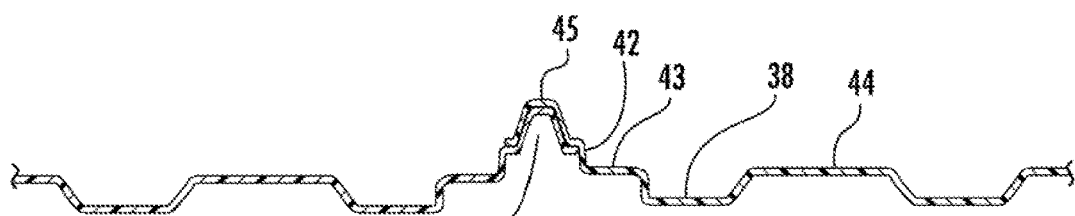
FIG. 14B shows a side view of the bond formed by the tongue and groove connection and FIG. 14C shows a side view of a tongue and groove engagement illustrating a locking member embodiment.
Figure 14C:
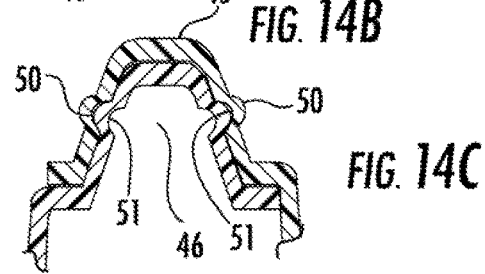
Figure 15:
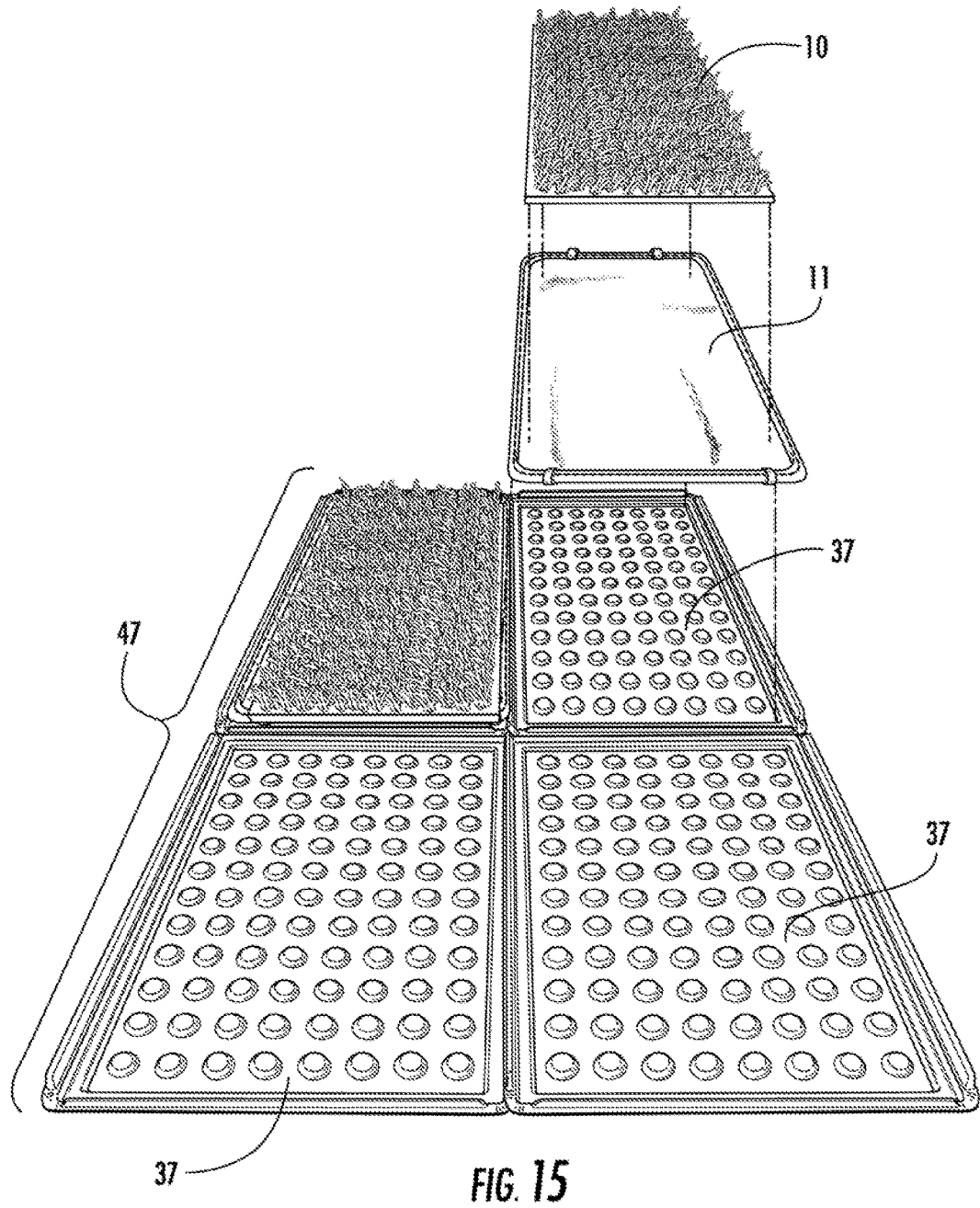
FIG. 15 shows an elevated view of the formation of a macro-composite from four micro-composites with trays.

Referring now to FIGS. 13-15, in some embodiments, composite trays 37 can be used wherein said combined first and second layers are placed. Referring now to FIG. 13, composite trays 37 can comprise a bottom surface 38; side walls 39, 40, 41, 42, composite outer edge support 43 positioned around the perimeter of the composite tray and inside the side walls. In some embodiments, bottom surface 38 can further comprise one or more elevation members 44 which serve to elevate composite structure off the bottom surface of composite tray 37. This feature prevents over saturation of composite structure and provides channels through which fluids can pass underneath said composite structure.

With continued reference to FIGS. 13-14, composite tray 37 can further comprise one or more tongues 45 and one or more grooves 46 for engaging two or more adjacent trays, together when forming a macro-composite 47. In one embodiment, each said groove 46 is formed from the hollow underside of each said tongue 45. When a user wishes to secure one or more trays together, the user merely overlays a groove 46 in one tray upon a corresponding tongue 45. When composite trays are used in this context, there can be no need to engage the second layers together since the trays are connected in a manner that avoids fluid leakage or seepage between trays due to the overlapping nature of the tongue and groove connection. Trays that have been secured together in this manner form a bond substantially impenetrable by pet waste. Composite structures can merely be placed in their respective trays which are attached to one another as illustrated in FIG. 15. In another embodiment, said tongue 45 and said groove 46 can further comprise locking members that lock said adjacent trays together when the groove of one tray overlays the tongue of an adjacent tray. Said locking members can comprise a rib assembly, for example, wherein said rib 48 extends the entire or partial length of a tongue. Upon overlay of said tongue and groove of adjacent trays and application of a slight downward pressure, said rib would engage its groove complement 49 within the groove of the other tray. In another embodiment, said locking members can comprise male detents 50 formed along the side surface of the tongue which again, as pressure is applied, interlock with their complimentary female detents 51 on an adjacent tray.

Referring now to FIGS. 13 and 14A, composite trays can further comprise one or more fluid extraction channels for convenient discarding or removal of waste fluids from the tray. In the embodiment shown in FIG. 13, channels 52, 53, 54, 55 are positioned at each corner in the gap between adjacent tongues along the perimeter of the tray. In some embodiments, the side wall at the fluid extraction channel can have a greater slope than other parts of the side wall allowing a more uniform and smoother flow of waste fluid through the channel as the user tilts the tray to discard the fluid.

Figure 16A:
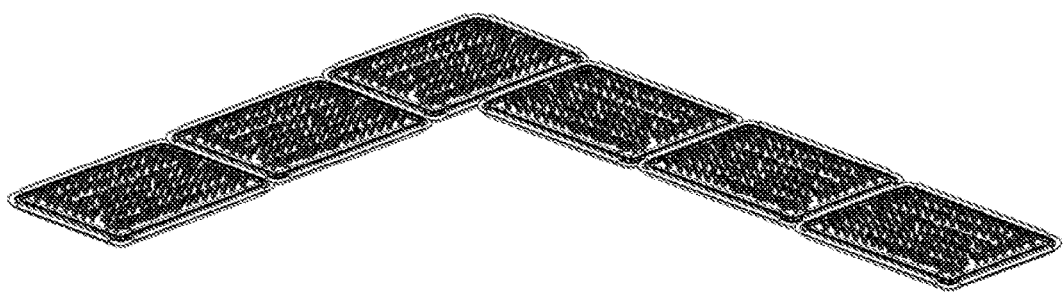
FIG. 16A-D shows elevated views of four macro-composite embodiments.
Figure 16B:
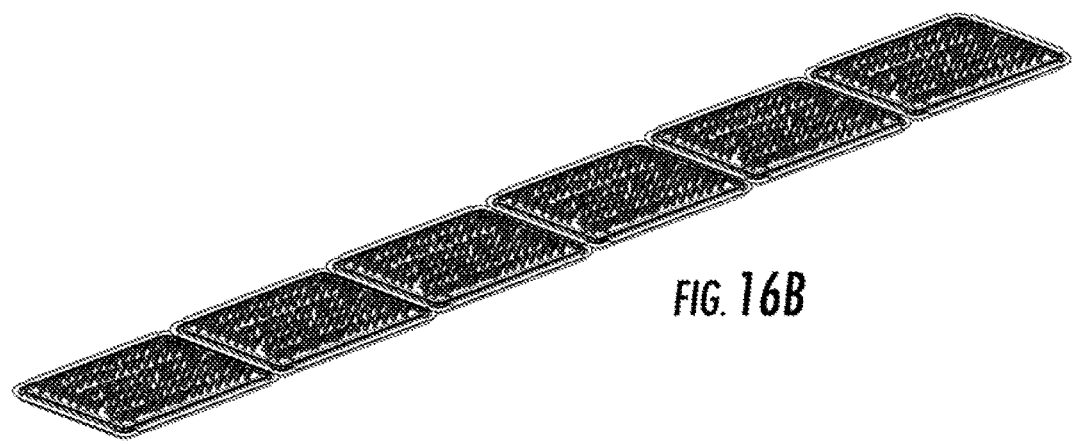
Figure 16C:
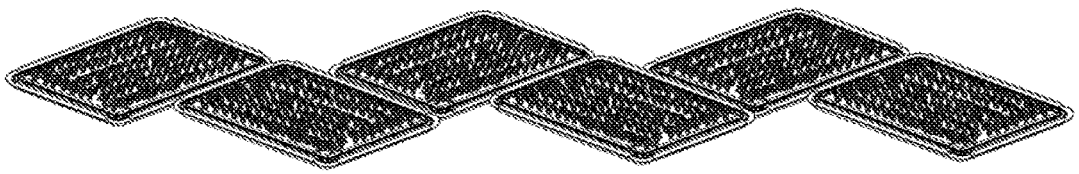
Figure 16D:
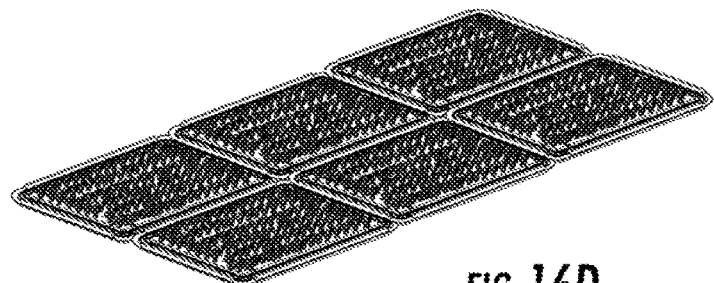

Referring now to FIG. 16A-D and, as described in some detail above, micro-composite structures can be combined with other micro-composite structures to form a macro-composite for increased or enhanced surface area coverage. While the macro-composite embodiments shown in FIG. 16A-D all comprise trays underlying the first and second layers, it should be understood that the macro-composites can be formed with or without trays. For example, in FIG. 16A, a macro-composite structure is formed between six micro-composite structures forming a 90° angle for rounding a corner between two intersecting walls within a home or apartment. FIG. 16B illustrates another macro-composite embodiment that is formed from six linearly arranged macro-composites for hallway coverage. FIG. 16C illustrates a macro-composite that forms a zigzag design and FIG. 16D is a macro-composite structure that is rectangular in shape for greater area or floor coverage, for example, substantially all of a single room. FIG. 16A-D is intended to illustrate the versatility and adaptability of the micro-composite structures to form a myriad of configurations.

Figure 17:
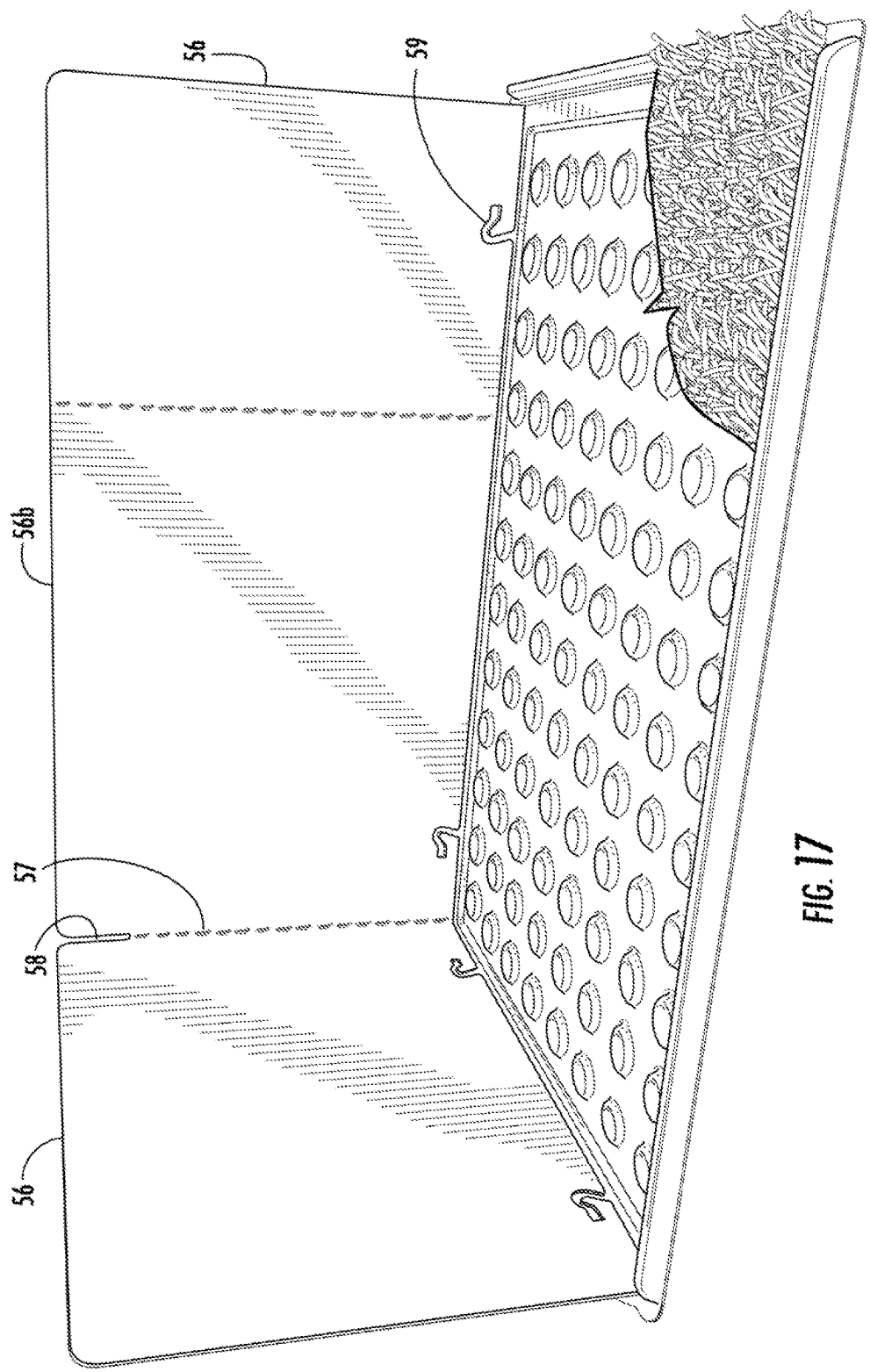
FIG. 17 shows an embodiment of the present invention with a vertical member attached.
Figure 18:
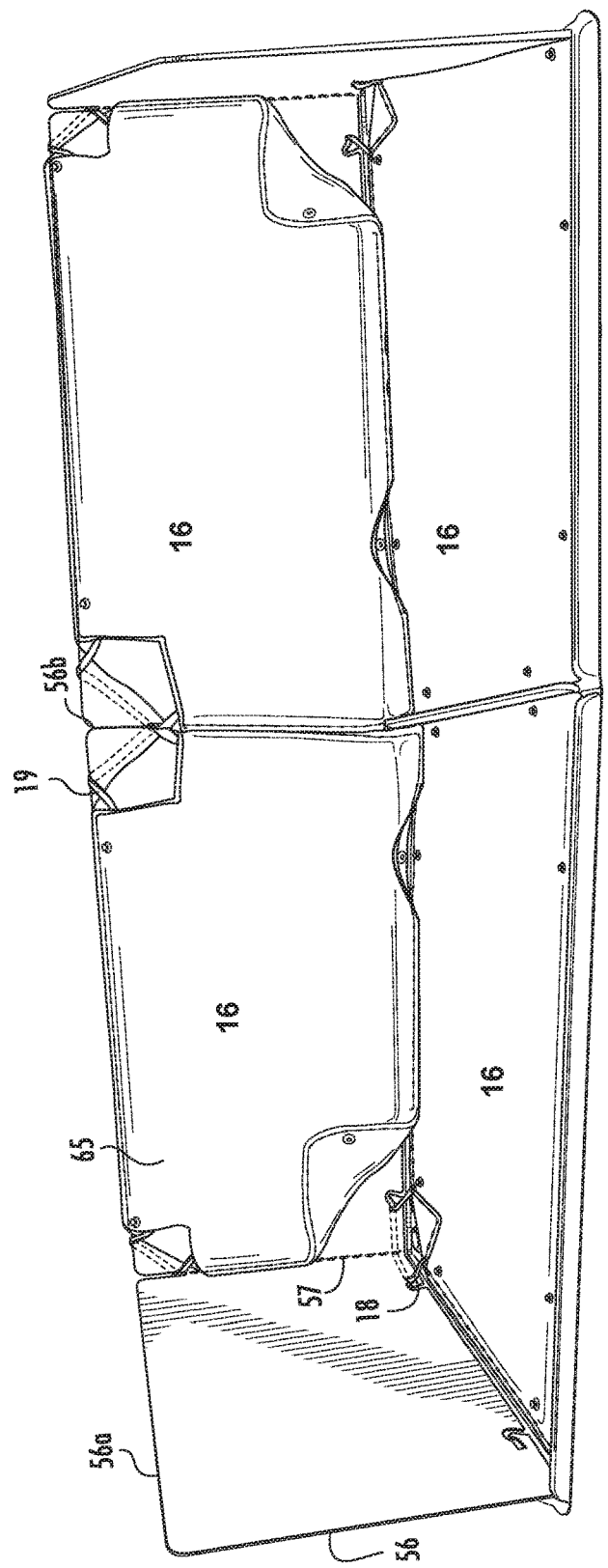
FIG. 18 shows an embodiment of the present invention with a vertical member attached.

Referring now to FIGS. 17 and 18, in some embodiments, the composite structure also comprises a substantially vertical member 56 which helps to confine unwanted pet waste to the composite structure for pets with poor aim, in particular male dogs with a preference for the lifted leg method over the squatting method. It has been observed that male dogs frequently miss the composite structure surface when they lift their legs to urinate.

In one embodiment, the substantially vertical member 56 can be engaged to or rest within or upon the composite structure around the perimeter and detachable therefrom. In some embodiments, the substantially vertical structure is itself modular. For example, in one embodiment, the substantially vertical structure comprises corner elements that are curved to surround the outer edge of each corner of the composite structure. Additionally, such a modular system might also comprise side panel elements that, in some embodiments, engage and connect to the corner members at their vertical edges. In said embodiments, the side panel elements run laterally down the outer edges of the composite structure between corner members. The substantially vertical structure can entirely surround the composite structure or can only guard a portion of the composite structure, for example, one side and two corners. In some embodiments, the securing members can be used to attach the components of the substantially vertical structure to the composite structure.

Alternatively, vertical members can span the length of (and guard) a single side or can guard multiple sides of the composite structure. For example, in the embodiment shown in FIG. 17, vertical member 56 guards two sides (a short and long side) of the composite structure. The vertical member 56 depicted in this embodiment is a single, piece design with two panels 56a, 56b (long and short due to the rectangular shape of the composite structure) with a flexible intersection 57 made of flexible material between the short side and long side guards or panels to allow bending of the vertical member about the corner. In this embodiment, the single piece bending design helps to maintain vertical orientation. In the embodiment shown in FIG. 17, the vertical member also comprises a slot 58 formed in the upper edge of said flexible intersection 57 between the short side and long side panels.

Figure 19:
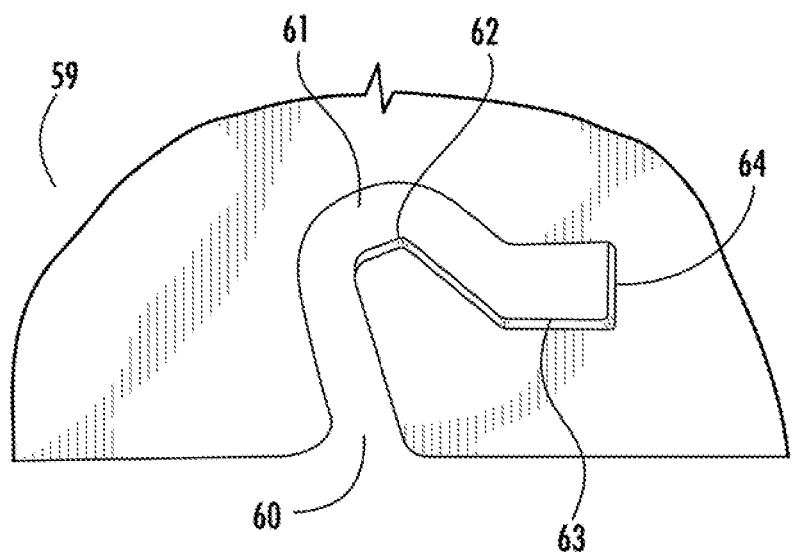
FIG. 19 shows an embodiment of a securing element on the vertical member for strap engagement.

Vertical members can comprise securing elements designed to secure said vertical member to the remaining composite components. In one embodiment, said securing elements are an integral feature of or built into said securing member. For example, in the embodiment shown in FIG. 17, said securing elements 59 are, in essence, cut out of the vertical member edges at predetermined positions with the appearance similar to a question mark in a horizontal orientation. The securing elements as best shown in the embodiment illustrated in FIG. 19, comprise a point of entry 60, a bight 61, a retention knob 62, a resting surface 63, and stop 64. Furthermore, said securing; elements in this embodiment are positioned at predetermined locations on the lower edges of the vertical member depicted FIG. 17, for example, said points of entry are about three (3) inches from outer edges or corners of said vertical members. Moreover, the securing members shown in this figure positioned at opposite corners of a vertical member panel are arranged in opposite orientation with said knobs 62 and stops 64 pointed in opposite directions.

In one embodiment, first engagement means, which is used to secure first layer 10 to second layer 11, is also used to secure vertical members to the underlying composite structure components. For example, in the embodiment illustrated in FIG. 18, elastic straps 18-21 (only elastic strap 18 is shown) are used to secure vertical members to the underlying components both holding the vertical members substantially about the perimeter of the underlying composite components and in an upright position (about 90° to the support surface e.g., floor). In this embodiment, one or more elastic straps engage securing elements 59 (shown more clearly in FIG. 19) entering the point of entry 60, rounding the bight 61, over the retention knob 62, and onto the resting surface 63.

In another embodiment, the walls of the vertical members themselves can be covered with one or more wall covers 65 which, in some embodiments, comprise another layer or mat of the same absorbent material that makes up the second layer 11. In the embodiment shown in FIG. 18, a wall cover 65 is illustrated substantially covering the vertical member wall facing the open horizontal area of the composite structure. In the embodiment shown in FIG. 18, said wall cover is identical in design to the second layer 11 shown in FIG. 11 with snaps and elastic straps. Thus, in this embodiment, the wall cover can be attached to the underlying second layer 11 via snaps to form a continuous absorbent layer avoiding passage, leaking or seepage of waste there between. For example, in the embodiment shown in FIG. 18, some overlap is visible between the wall cover and the underlying second layer at the approximate point of attachment which helps to further contain waste. In one embodiment shown in FIG. 18, wall cover 65 uses one or more straps (e.g., 18-21) to secure, for example, its upper corners to the upper corners of the vertical member maintaining substantial coverage of the vertical member surface area. In this embodiment, straps loop around the corners of the vertical member panels. With continued reference to FIG. 18, at the flexible intersection 57, a strap (e.g., 18-21) slides within and engages slot 58 and strap (e.g., strap 20) engages the opposite upper corner. It should be noted that the number, dimensions, and orientation of wall covers used is variable. For example, a long wall cover may be used for a short panel 56b whereby a substantial portion of the wall cover length is tucked under the second layer 11.

The substantially vertical member can be made of various materials, for example, thermoplastic materials including Poly(methyl methacrylate) (PMMA) or plexiglas, as well as various polyolefin polymers, such as polyethylene or polypropylene. In other embodiments, simple paper based materials with sufficient strength and durability to maintain a rigid structural integrity of the vertical member are used, such as card board or the like. Said paper based materials can be coated (e.g., with wax or plastic) to lessen or prevent degradation due to moisture. It should be recognized that many suitable materials are available for use in this manner as long as they are sufficiently rigid to maintain its substantially vertical orientation. For example, in one embodiment, the substantially vertical members comprise one or more wall covers 65 alone, as long as the wall cover 65 is capable of maintaining the proper orientation.

The present invention also generally relates to a method of pet waste disposal wherein a user employs the system to conveniently and cleanly capture and discard pet waste with minimal waste contamination of the residence living environment. In one embodiment, the method comprises the steps of providing a composite structure according to the description of the embodiments provided above, attaching said first layer to said second layer, placing said composite structure on a solid support surface in a manner accessible to the animal, and cleaning said second layer when substantially saturated with liquid waste. In another embodiment, the method can farther comprise the step of attaching a plurality of composite structures together to accommodate a larger area such that the second layers are attached in a manner that avoids leakage of fluid between second layers. In another embodiment, the method can further comprise the step of attaching a plurality of trays together and placing a corresponding number of composite structures within said trays. In said method, a user can discard any urine collected in the bottom of said trays by tilting the trays in a manner promoting flow of urine through the built-in extraction channels. In another embodiment, the method can also comprise attaching one or more substantially vertical members to the outer perimeter of the composite structure to avoid floor contamination. In one embodiment, a single vertical member guarding two edges of a composite structure can be secured to the composite structure by engaging one or more securing elements integral to said vertical member with elastic straps of second layer. In another embodiment, the user can attach a wall cover to said vertical member to enhance waste containment and prolong the life of vertical member panels.

In another embodiment, the method of pet waste containment and disposal comprises the steps of providing a macro-composite portable sanitation apparatus in variable geometric configurations upon a horizontal surface comprising a plurality of micro-composite structures. In some embodiments, each micro-composite structure can comprise a first layer wherein said first layer comprises artificial grass-like fibers, a backing member, and a mesh substrate, and a second layer comprising an absorbent top element, an impervious backing element top, bottom, and side outer edges and a front and back face wherein said front and back faces comprise a plurality of securing members tilt securing to one or more adjacent second layers. The method can farther comprise the steps of securing said second layers of adjacent micro-composites together wherein said second layers, partially overlap for proper waste containment; attaching said first layer of each micro-composite structure to said second layer to form a macro-composite; placing said macro-composite on a solid support surface in a manner accessible to the animal, and cleaning said second layers when substantially saturated with liquid waste.

In yet another embodiment, the method of pet waste containment and disposal comprising the steps of providing a macro-composite portable sanitation apparatus in variable geometric configurations upon a horizontal surface comprising a plurality of micro-composite structures. In some embodiments, each micro composite structure can comprise a first layer wherein said first layer comprises artificial grass-like fibers, a backing member, and a mesh substrate, a second layer comprising an absorbent top element, an impervious backing element, and an underlying tray for supporting said first and second layers. In some embodiments, the tray can comprise a tongue and groove assembly for engaging with one or more other adjacent trays, and waste extraction channels. The method can comprise the additional steps of securing said tongue of one tray to the matching groove of an adjacent tray resulting in an overlapping bond between adjacent trays impenetrable to liquid or solid pet waste; attaching said first layer of each micro-composite structure to said second layer to form a plurality of micro-composites; placing each said micro-composite within a corresponding tray to form the macro-composite; and placing said macro-composite on a solid support surface in a manner accessible to the animal. In some embodiments, the method can further comprise one or more of the following steps: removing the first and second layers from said tray and cleaning said second layer when saturated with pet waste; tilting said tray to dispose of remaining pet waste through said waste extraction channels; arranging and securing the micro-composite structures together in variable desired configurations including but not limited to a right angle configuration, a substantially rectangular configuration, a substantially square configuration, or a zigzag configuration.

While the present invention has been described herein with respect to the exemplary embodiments, it will become apparent to one of ordinary skill in the art that many modifications, improvements and sub-combinations of the various embodiments, adaptations and variations can be made to the invention without departing from the spirit and scope thereof.

What is claimed is:

1. A portable sanitation micro-composite apparatus for pet waste disposal and macro-composite assembly in variable geometric configurations comprising:
    a horizontal member capable of absorbing and substantially retaining liquid pet waste comprising a front face, a back face, at least one outer edge, a plurality of lateral securing elements positioned about the at least one outer edge, and a plurality of corner securing elements;
    a vertical member comprising one or more substantially vertical spray shielding panels positioned about the outer edges of said horizontal member;
    a wall cover capable of absorbing and substantially retaining liquid pet waste comprising a front face, a back face, at least one outer edge, a plurality of lateral securing elements positioned about the at least one outer edge, and a plurality of corner securing elements;
    wherein at least one of said lateral securing elements of said wall cover corresponds to at least one of said lateral securing elements of said horizontal member and wherein said wall cover and said horizontal member are capable of being secured to one another by said corresponding lateral securing elements;
    wherein said at least one of said corner securing elements of said wall cover engages said vertical member for securing said wall cover to said vertical member.

2. The portable sanitation micro-composite apparatus of claim 1 wherein said panels further comprise a flexible intersection between two connected panels and a slot positioned at said flexible intersection.

3. The portable sanitation micro-composite apparatus of claim 1 wherein said panels comprise a wax coated cardboard.

4. The portable sanitation micro-composite apparatus of claim 1 wherein said front face of said horizontal member comprises a layer of substantially permeable woven polyester material.

5. The portable sanitation micro-composite apparatus of claim 1 wherein said panels further comprise one or more securing receptacles positioned at the bottom outer edges of said panels for securing said panels to said horizontal member.

6. The portable sanitation micro-composition apparatus of claim 5 wherein securing receptacles comprise a point of entry, a bight, a retention knob, a resting surface, and a stop.

7. The portable sanitation micro-composite apparatus of claim 1 wherein said corner securing elements comprise elastic straps.

8. The portable sanitation micro-composite apparatus of claim 7 wherein said corner securing elements engage said securing receptacles positioned at the bottom edges of said panels.

9. The portable sanitation micro-composite apparatus of claim 1 further comprising a tray in which said horizontal member rests.

10. The portable sanitation micro-composite apparatus of claim 1 further comprising a turf imitating mat resting on top of said horizontal member.

11. A portable sanitation micro-composite apparatus for pet waste disposal and macro-composite assembly in variable geometric configurations comprising:
    a horizontal member capable of absorbing and substantially retaining liquid pet waste comprising a front face, a back face, at least one outer edge, a plurality of lateral securing elements positioned about the at least one outer edge, and a plurality of corner securing elements;
    a vertical member comprising one or more substantially vertical spray shielding panels positioned about one or more of the outer edges of said horizontal member and capable of absorbing and substantially retaining liquid pet waste;
    wherein said one or more spray shielding panels further comprises a front face, a back face, at least one outer edge, a plurality of lateral securing elements positioned about the at least one outer edge, and a plurality of corner securing elements; and
    wherein at least one of said plurality of lateral securing elements of said spray shielding panels corresponds to at least one of said plurality of lateral securing elements of said horizontal member and wherein said spray shielding panels and said horizontal member are capable of being secured to one another by said corresponding plurality of lateral securing elements.

12. The portable sanitation micro-composite apparatus of claim 11 wherein said one or more spray shielding panels comprises a mat comprised of an absorbent nonwoven material.

13. The portable sanitation micro-composite apparatus of claim 11 wherein said front face of said horizontal member comprises a layer of substantially permeable woven polyester material.

14. A method of pet waste containment and disposal comprising the steps of:
    providing two or more micro-composite structures, each micro-composite structure comprising a horizontal member, a wall cover, and a vertical member capable of supporting said wall cover;
    wherein said horizontal member and said wall cover each are capable of absorbing and substantially retaining liquid pet waste and comprise top, bottom, and side outer edges and front and back faces;
    wherein said front and back faces of each horizontal member and each wall cover comprise a plurality of lateral securing members;

wherein said back faces of each horizontal member and each wall cover comprise a plurality of corner securing members;

securing said horizontal member and said wall cover together with said plurality of lateral securing members;

securing said wall cover and said horizontal member to said vertical member with said plurality of corner securing members;

securing said micro-composite structures together to form a macro-composite structure; and arranging said micro-composite structures in a preferred geometric configuration about a predetermined area in a manner accessible to a pet animal.

15. The method of claim 14 wherein said vertical member comprises one or more securing elements positioned at bottom outer edges of said vertical member and further comprising the step of securing said vertical member to said horizontal member with said one or more securing elements.

16. The method of claim 15 wherein said vertical member securing elements are adapted to receive corner securing elements of said horizontal member and comprise a point of entry, a bight, a retention knob, a resting surface, and a stop.

17. The method of claim 16 wherein said corner securing members of said horizontal member comprise elastic straps and further comprising the step of hooking said elastic straps to said vertical member securing elements.

18. A portable sanitation micro-composite apparatus for pet waste disposal and macro-composite assembly in variable geometric configurations comprising:

a horizontal member capable of absorbing and substantially retaining liquid pet waste comprising a front face, a back face, at least one outer edge, a plurality of lateral securing elements positioned about the at least one outer edge;

a turf imitating mat resting on top of the horizontal member comprising a plurality of corner securing members;

a vertical member comprising one or more spray shielding panels positioned about the outer edges of said horizontal member and turf imitating mat and further comprising one or more securing receptacles positioned at the bottom outer edges of said panels each securing receptacle configured to engage a corresponding corner securing member of said turf imitating mat for securing said panels to said turf imitating mat;

wherein said one or more securing receptacles comprise a point of entry, a retention knob, a resting surface, and a stop.

19. The portable sanitation micro-composite apparatus of claim 18 wherein said spray shielding panels further comprise a flexible intersection between two connected panels and a slot positioned at said flexible intersection.

20. The portable sanitation micro-composite apparatus of claim 18 further comprising a tray in which said horizontal member and turf imitating mat rest.

* * * * *